US012548150B2

(12) United States Patent
Heitz et al.

(10) Patent No.: US 12,548,150 B2
(45) Date of Patent: Feb. 10, 2026

(54) METHOD AND SYSTEM FOR SEGMENTING AND IDENTIFYING AT LEAST ONE TUBULAR STRUCTURE IN MEDICAL IMAGES

(71) Applicant: VISIBLE PATIENT, Strasbourg (FR)

(72) Inventors: Adrien Heitz, Obernai (FR); Julien Weinzorn, Strasbourg (FR); Luc Soler, Strasbourg (FR)

(73) Assignee: STRASBOURG, Strasbourg (FR)

( * ) Notice: Subject to any disclaimer, the term of this patent is extended or adjusted under 35 U.S.C. 154(b) by 348 days.

(21) Appl. No.: 18/031,101

(22) PCT Filed: Oct. 19, 2021

(86) PCT No.: PCT/EP2021/078899
§ 371 (c)(1),
(2) Date: Apr. 10, 2023

(87) PCT Pub. No.: WO2022/084286
PCT Pub. Date: Apr. 28, 2022

(65) Prior Publication Data
US 2023/0410291 A1 Dec. 21, 2023

Related U.S. Application Data

(60) Provisional application No. 63/104,478, filed on Oct. 22, 2020.

(51) Int. Cl.
*G06T 7/00* (2017.01)
*G06T 7/13* (2017.01)

(52) U.S. Cl.
CPC .............. *G06T 7/0012* (2013.01); *G06T 7/13* (2017.01); *G06T 2207/20084* (2013.01); *G06T 2207/20221* (2013.01); *G06T 2207/30061* (2013.01)

(58) Field of Classification Search
CPC ............... G06T 7/0012; G06T 7/12; G06T 2207/20084; G06T 2207/20221; G06T 2207/30061
See application file for complete search history.

(56) References Cited

U.S. PATENT DOCUMENTS

2011/0158491 A1* 6/2011 Markova ................ G06T 7/41
382/128

OTHER PUBLICATIONS

Cui, Hejie et al. "Pulmonary Vessel Segmentation Based on Orthogonal Fused U-Net++ of Chest CT Images" Medical Image Computing and Computer Assisted Intervention—MICCAI 2019. vol. 11769. Switzerland: Springer International Publishing AG, 2019. 293-300. Web. (Year: 2019).*

(Continued)

*Primary Examiner* — John R Wallace
(74) *Attorney, Agent, or Firm* — IPSILON USA, LLP

(57) ABSTRACT

This invention concerns a computer implemented method for segmenting and identifying at least one tubular structure, having a 3D tree layout and located in at least one body part of a subject, in medical images showing a volume region of interest of said subject containing said body part(s), and for providing a labelled 3D image of said structure(s),
said method mainly comprising the steps of:
providing a set of 2D medical images corresponding to respective mutually distinct sectional views across said region of interest containing said body part(s), the planes of said medical images being all perpendicular to a given direction or all mutually intersecting at a given straight line,
segmenting the visible section(s) of the concerned body part(s) present in each one of said 2D medical images, which comprises in particular the complete linear outline or external boundary of said body (Continued)

part(s) visible in the considered 2D image, and creating a corresponding 2D body part masking image, pre-processing each 2D medical image, by applying the corresponding body part masking image to it and so producing processed images containing only the image data of the original 2D image which are related to said body part(s), segmenting the tubular structure(s) in said resulting pre-processed images, possibly by segmenting tubular structures of different kinds in differentiated segmentation processes, performing the previous steps with at least one other set of 2D medical images corresponding to other respective distinct sectional views, along other mutually parallel or intersecting planes, of said same volume region of interest containing said same body part(s), merging the results of the tubular structure segmentations of the different sets of pre-processed images, in order to provide a labelled 3D image of said tubular structure(s) of one or different kind(s).

17 Claims, 18 Drawing Sheets

(56) References Cited

OTHER PUBLICATIONS

Cui Hejie et al: "Pulmonary Vessel Segmentation Based on Orthogonal Fused UNet of Chest CT Images", Oct. 10, 2019.
Keshwani Deepak et al: "TopNet: Topology Preserving Metric Learning for Vessel Tree Reconstruction and Labelling", Sep. 29, 2020.
International Search Report dated Jan. 14, 2022.

* cited by examiner

METHOD AND SYSTEM FOR SEGMENTING AND IDENTIFYING AT LEAST ONE TUBULAR STRUCTURE IN MEDICAL IMAGES

RELATED APPLICATION

This application is a National Phase of PCT/EP2021/078899 filed on Oct. 19, 2021, which claims the benefit of priority from U.S. Provisional Patent Application No. 63,104,478, filed on Oct. 22, 2020, the entirety of which are incorporated by reference.

FIELD OF THE INVENTION

The present invention is related to the field of data processing, more specifically to the treatment and analysis of images, in particular the segmentation and labelling of medical images, and concerns a computer implemented method for segmenting and identifying at least one tubular structure, having a 3D tree layout and located in at least one body part of a subject, in medical images.

PRIOR ART

A three-dimensional image made from a medical imaging device such as a scanner, MRI, ultrasound, CT or SPEC type image is composed of a set of voxels, which are the basic units of a 3D image. The voxel is the 3D extension of the pixel, which is the basic unit of a 2D image. Each voxel is associated with a grey level or density, which can be considered to be the result of a 2D function F(x, y) or a 3D function F(x, y, z), where x, y and z denote spatial coordinates (see FIG. 1).

In 3D images, voxels can be seen in 2D according to various planes (slices). The three main planes in medical images are the axial, sagittal and frontal ones (FIG. 2). Nevertheless, a limitless number of planes can however be created as mutually parallel planes along axes perpendicular to said axial, sagittal or frontal plane or by rotation around an intersection line (such as for example the intersection line of the sagittal and coronal planes-see FIG. 2), each plane having a different angulation.

Typically, a 2D or 3D medical image contains a set of anatomical and pathological structures (organs, bones, tissues, . . . ) or artificial elements (stents, implants, instruments, . . . ) that clinicians have to delineate in order to evaluate the situation and to define and plan their therapeutic strategy. In this respect, organs and pathologies have to be identified in the image, which means labelling (for example coloring) each pixel of a 2D image or each voxel of a 3D image. This process is called segmentation.

The segmentation of the bronchus tree and pulmonary arteries and veins in CT scans can play an important role in patient care for both diagnosis and treatment phases. The same applies to other organs or body parts of a subject, such as for example the liver or the kidneys, and their vascular trees. However, the extraction of theses tubular structures using either manual or interactive segmentation tools is time-consuming and prone to error due to the complexity of aerial and vascular trees.

Now, tubular structures define lung and liver cartographies (as non-limiting examples of aimed organs) and allow to understand lobe vascularization. Aerial and vascular structure in case of lungs and vascular structure in case of liver can thus provide relevant information to plan interventions and also to supply insights for diagnosis.

To perform such tasks in the case of the lungs, bronchus tree and pulmonary artery and vein segmentation should be reliable and accurate. Obtaining full tubular structure segmentation of lungs manually is tedious due to the complex tree structure. Experts often need to rely on their knowledge to be able to infer on the presence of vessels or on their belonging to the artery or vein tree. Finally, manually extracting lungs trees is time consuming and prone to inter- and intra- rater variation. Consequently, there is a need to develop methods that can cope with complex structures.

There are many known methods to perform a segmentation, in particular automatic methods making use of algorithms, especially AI algorithms.

In this context, numerous variations of neural networks have been used in the state of the art, generally all based on standard non-specific architectures, resulting globally in a waste of inappropriate resources and a lack of efficiency and accuracy.

Thus, with respect to lungs, several research groups have previously proposed methods that perform either bronchus tree or vascular tree segmentation automatically. For bronchus tree extraction, EXACT'09 challenge (see reference [1] mentioned in detail hereinafter) allowed to compare methods which were mostly based on region growing approaches. More recently, different deep learning approaches (see references [2] to [8]) have been applied to the bronchus segmentation task and outperformed previous methods. Most approaches are based on the 3D version of the U-Net architecture (see reference [9]). For instance, Qin et al. (see reference [3]) proposed to transform the binary segmentation of bronchus into a 26-classes connectivity prediction task allowing to reduce fragmentation. Zhao et al. (see reference [5]) combines a 2D U-Net to detect horizontal bronchus branches and a 3D U-Net for other branches orientation. Despite the usage of 3D network for bronchus tree segmentation, it is not clear that the choice of 3D networks is better than 2D approaches for computation tractability and power of representation (see references [8], and [11]).

OBJECTS AND SUMMARY

The main aim of the present invention is to propose a new method to overcome the aforementioned limitations, not only in relation to tubular structures in the lungs, but also other organs and body parts, with the aim of achieving reliable and precise results using limited resources and within limited time frames.

For this purpose, the present invention proposes a computer implemented method for segmenting and identifying at least one tubular structure, having a 3D tree layout and located in at least one body part of a subject, in medical images showing a volume region of interest of said subject containing said body part(s), and for providing a labelled 3D image of said structure(s), said method mainly comprising the steps of:
    providing a set of 2D medical images corresponding to respective mutually distinct sectional views across said region of interest containing said body part(s), the planes of said medical images being all perpendicular to a given direction or all mutually intersecting at a given straight line,
    segmenting the visible section(s) of the concerned body part(s) present in each one of said 2D medical images, which comprises in particular the complete linear outline or external boundary of said body part(s) visible in the considered 2D image, and creating a corresponding 2D body part masking image, pre-processing each 2D medical image, by applying the corresponding body part masking image to it and so producing processed images containing only the image data of the original 2D image which are related to said body part(s), segmenting the tubular structure(s) in said resulting pre-processed images, possibly by segmenting tubular structures of different kinds in differentiated segmentation processes, performing the previous steps with at least one other set of 2D medical images corresponding to other respective distinct sectional views, along other mutually parallel or intersecting planes, of said same volume region of interest containing said same body part(s), merging the results of the tubular structure segmentations of the different sets of pre-processed images, in order to provide a labelled 3D image of said tubular structure(s) of one or different kind(s).

Thus, the underlying principle of the invention is to provide a fully automated method, based on a hierarchical approach and relying on a 2-step cascaded computational and data treatment process, for performing segmentation and identifying tasks, which only handles the relevant data and hence is more effective in terms of use of computational resources and treatment time.

In order to enhance the level of reliability of the automatic segmentation, it may be provided that the step of segmenting the tubular structure(s) of a considered pre-processed image comprises taking also into account the image data of at least one other pre-processed sectional view, of the same set of images, which is adjacent said considered pre-processed image, for example of at least the nearest neighboring sectional view(s) located on each side of said considered pre-processed image.

According to a preferred embodiment of the invention, the body part segmenting steps are performed by using a 2D neural network and the tubular structure segmenting steps are performed by using a 2.5D neural network, said neural networks being preferably U-Net neural networks.

Advantageously, a dedicated neural network, previously trained on data labelled by an expert or a group of experts, is used for the body part segmenting and pre-processing steps of each set of 2D medical images, a dedicated and specifically trained neural network being also used for segmenting the tubular structure(s) in each set of pre-processed images, possibly one specific neural network for each kind of tubular structure.

More precisely, it may be envisaged that, in a preliminary preparatory phase of the invention, the final training parameters values of the neural network or group of neural networks intended to handle a first set of medical images are used as starting parameter values for the training of at least one other neural network or group of neural networks intended to handle another set of medical images, in the pre-processing phase and/or in the tubular structure segmenting phase.

In accordance with a conventional slicing of the 3D medical image, a first set of medical images may correspond to axial views of the subject and second and third sets of medical images may correspond respectively to sagittal and coronal views.

Advantageously, in relation to the preprocessing of the 2D medical images, the steps of segmenting the concerned body part(s) in each one of said 2D medical images and creating a corresponding body part masking image consist in determining the outline(s), boundary(ies) and/or internal area(s) of said body parts(s) and in locating and identifying the connection site(s) of the internal tubular structure(s) with at least one other body part or body component, said latter being or not part of the masking image.

In order to be able to handle image data in a similar way even if they may originate from various sources or in different formats, before the steps of segmenting the concerned body part(s) in each one of the 2D medical images of a given set and creating a corresponding body part masking image, said images (in particular CT scan images) are undergoing operations of an initial treatment workflow comprising at least retrimming and resizing operations, and possibly also a normalizing operation.

Additionally, during the pre-processing phase, the modified pre-processed image resulting from applying the body part masking image to an original 2D medical image, may be submitted, before applying the step of segmenting the tubular structure(s), to isotropic resampling and rescaling operations.

For the purpose of using the computational resources in an optimized manner, the invention may provide that any medical image for which the corresponding body art masking image, in anyone of the sets of medical images, is empty and also any pre-processed image which does not show any part of the considered body part(s) are disregarded in view of further processing.

According to a most preferred application of the invention, the medical images are images of the thoracic cavity of a human subject, wherein the concerned body parts are the lungs, wherein the segmenting step also includes identifying the left lung and the right lung and wherein at least certain body part masking images also contain the representation of the trachea and the connection area between pulmonary arteries and veins and the heart.

In this context, a practical embodiment of the invention, which can provide a fully automatic method relying on cascaded convolutional neural networks to perform lungs, bronchus and pulmonary arteries and veins segmentation, comprises a first component which is dedicated to right and left lung segmentation (using for example a slightly modified 2D U-Net architecture) and a second component relying on a three-paths 2.5D fully convolutional networks along axial, coronal and sagittal slices, fed with pre-processed 2D images (masked with the convex hull of the lungs) and focusing on tubular structures and components extraction and labelling.

In a first alternative, in relation to lung segmentation, two different types of tubular structures are segmented in parallel, namely the bronchus tree and the pulmonary vascular tree, the arteries and veins being labelled within the vascular tree in a further step.

In a second alternative, three different types of tubular structures are segmented in parallel, namely the bronchus tree, the pulmonary artery tree and the pulmonary vein tree.

With respect to another application of the invention, the medical images are abdominal images, wherein the concerned body part is the liver and wherein the vascular system to be segmented and labelled comprises the portal vein, the hepatic vein and the hepatic artery.

According to another aspect of the invention, the final merging step is performed by means of a fusion operation consisting of a type of operation chosen among fusion by union, fusion by majority voting, fusion by logits averaging, fusion by neural network and fusion by simultaneous truth and performance level estimation.

The invention also encompasses an image treatment system able to fully automatically perform organ and inside tubular structure segmentation and labeling, in particular lungs, bronchus and pulmonary arteries and veins segmentation, said system relying on cascaded convolutional neural networks, characterized in that it comprises a first component which is dedicated to organ segmentation, for example right and left lung segmentation, and is based on a slightly modified 2D U-Net architecture and a second component based on a three-paths 2.5D fully convolutional networks along axial, coronal and sagittal slices, fed with pre-processed 2D images of the first component and configured to perform tubular structures and elements extraction and labelling.

The invention will be better understood using the description below, which relates to at least one preferred embodiment, given by way of non-limiting example and explained with reference to the accompanying drawings, in which

DETAILED DESCRIPTION

The FIGS. 1 to 11 illustrate, at least partly, a computer implemented method for segmenting and identifying at least one tubular structure, having a 3D tree layout and located in at least one body part of a subject, in medical images showing a volume region of interest of said subject containing said body part(s), and for providing a labelled 3D image of said structure(s).

According to the invention, said method mainly comprising the steps of:
 providing a set of 2D medical images corresponding to respective mutually distinct sectional views across said region of interest containing said body part(s), the planes of said medical images being all perpendicular to a given direction or all mutually intersecting at a given straight line,
 segmenting the visible section(s) of the concerned body part(s) present in each one of said 2D medical images, which comprises in particular the complete linear outline or external boundary of said body part(s) visible in the considered 2D image, and creating a corresponding 2D body part masking image,
 pre-processing each 2D medical image, by applying the corresponding body part masking image to it and so producing processed images containing only the image data of the original 2D image which are related to said body part(s),
 segmenting the tubular structure(s) in said resulting pre-processed images, possibly by segmenting tubular structures of different kinds in differentiated segmentation processes,
 performing the previous steps with at least one other set of 2D medical images corresponding to other respective distinct sectional views, along other mutually parallel or intersecting planes, of said same volume region of interest containing said same body part(s),
 merging the results of the tubular structure segmentations of the different sets of pre-processed images, in order to provide a labelled 3D image of said tubular structure(s) of one or different kind(s).

The basic idea of the invention is to propose a process organized around a hierarchical workflow steps approach and making use of a 2-step cascaded framework.

While the invention is described herein mainly with respect to lungs, the person skilled in the art may easily recognize that it can be applied to any organ comprising tubular structures, in particular of the vasculatory type. Such is in particular the case for the liver.

Figure 1:
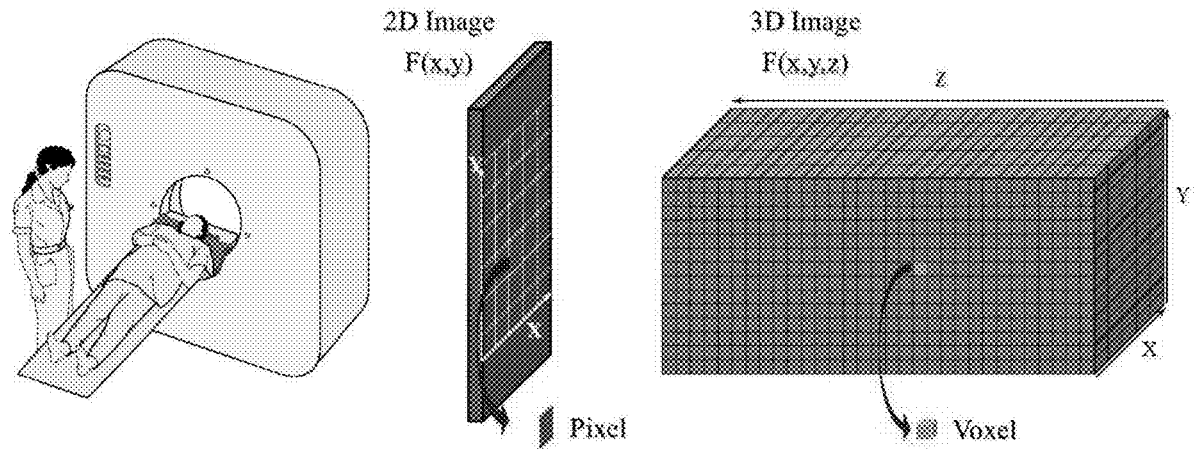
FIG. 1 illustrates a medical imaging device and the relationship between a 2D pixel and a 3D voxel.
Figure 2:
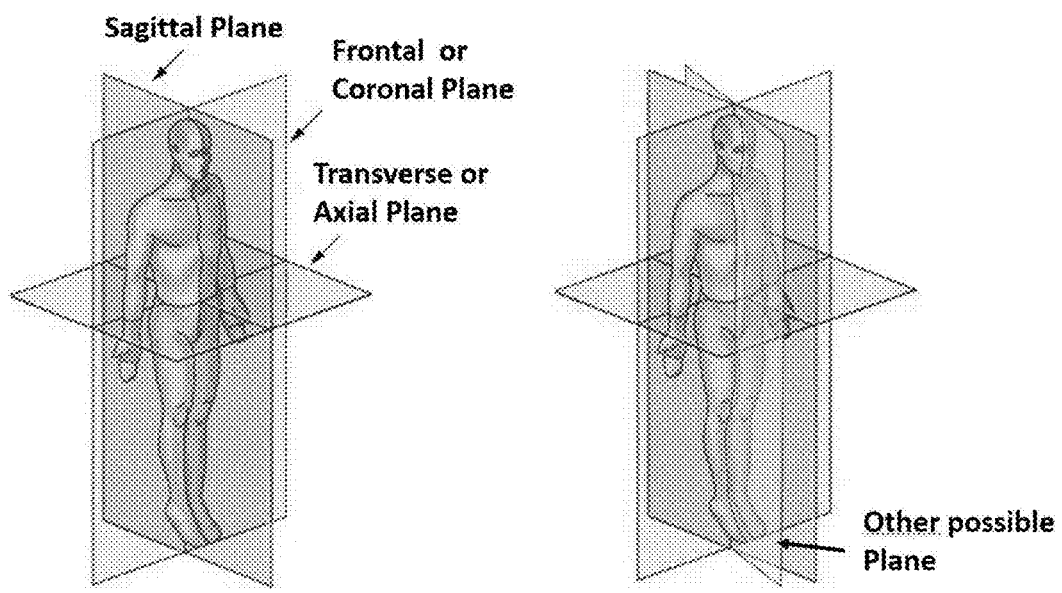
FIG. 2 illustrates the axial, sagittal, frontal and possible other planes (slices) of a 3D images.
Figure 3:
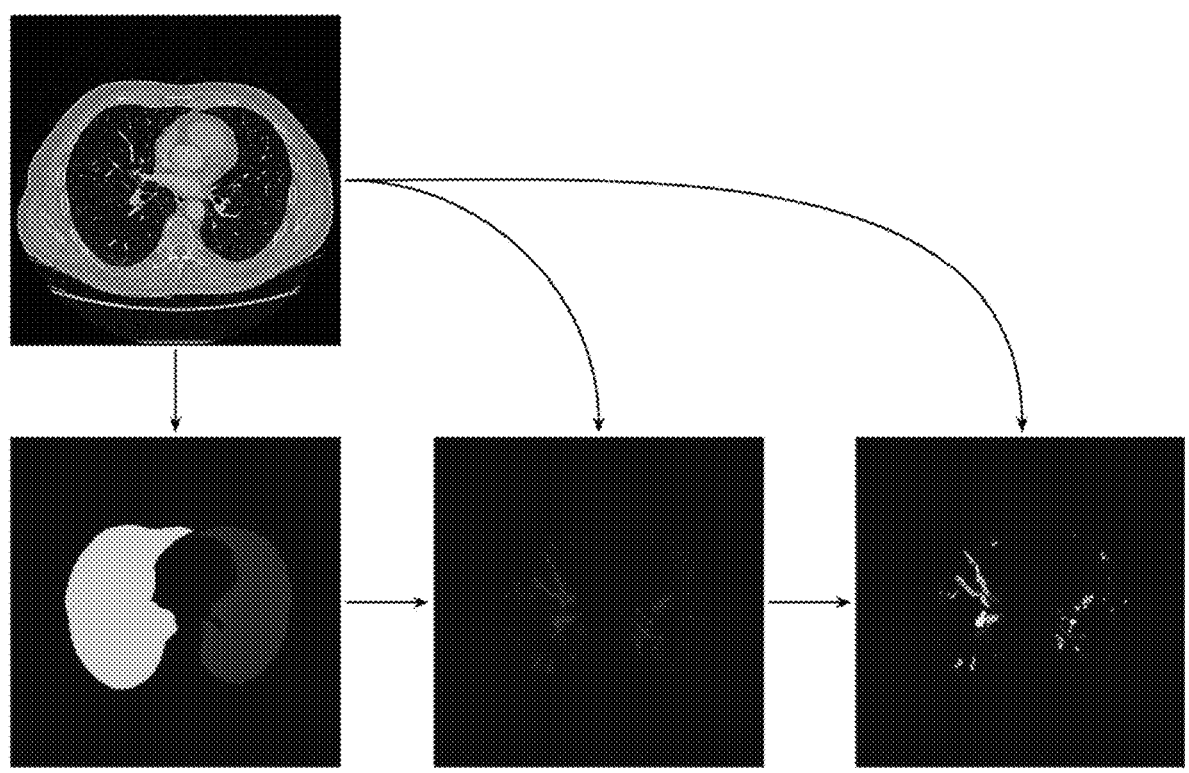
FIG. 3 shows schematically and broadly, by means of an example based on a 2D axial view of the lungs (CT scan image), the hierarchical workflow steps (here three steps) of the method of the invention.

A first gross illustration of a first example of one of the core features of the inventive method is apparent in FIG. 3, which shows that the workflow can be decomposed into three main steps:
 the first step consists in the segmentation of the right and left lungs directly from the CT scans,
 the second step consists in extracting the bronchus jointly with the vessels on the lungs masked CT images as one class. So, this step gives a pre-segmentation of the bronchial and vascular tree which will be used in the last step. The only pre-processing applied to lungs was for each one to select the greatest connected component,
 the third and last step aims at taking the CT scan and to concatenate to it the pre-segmentation of the bronchus and the vessels as an input of a neural network. This helps the network which has already detected tubular structures and should only classify them.

Figure 4A:
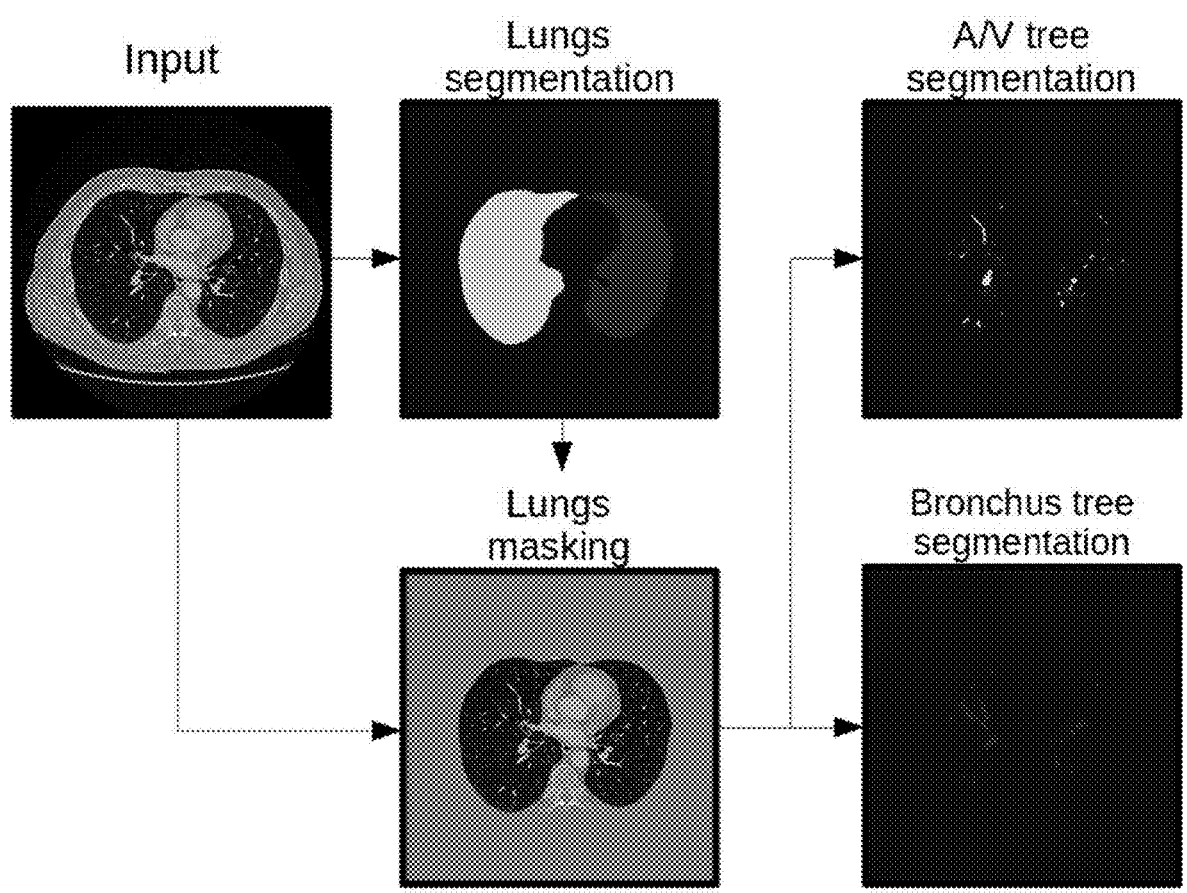
FIGS. 4A and 4B show in a more refined representation, based on the same input image as in FIG. 3, two alternatives of the hierarchical workflow steps (here four or five steps) of the method of the invention, applied to the segmentation and labelling of the lungs, bronchus and pulmonary arteries and veins.
Figure 4B:
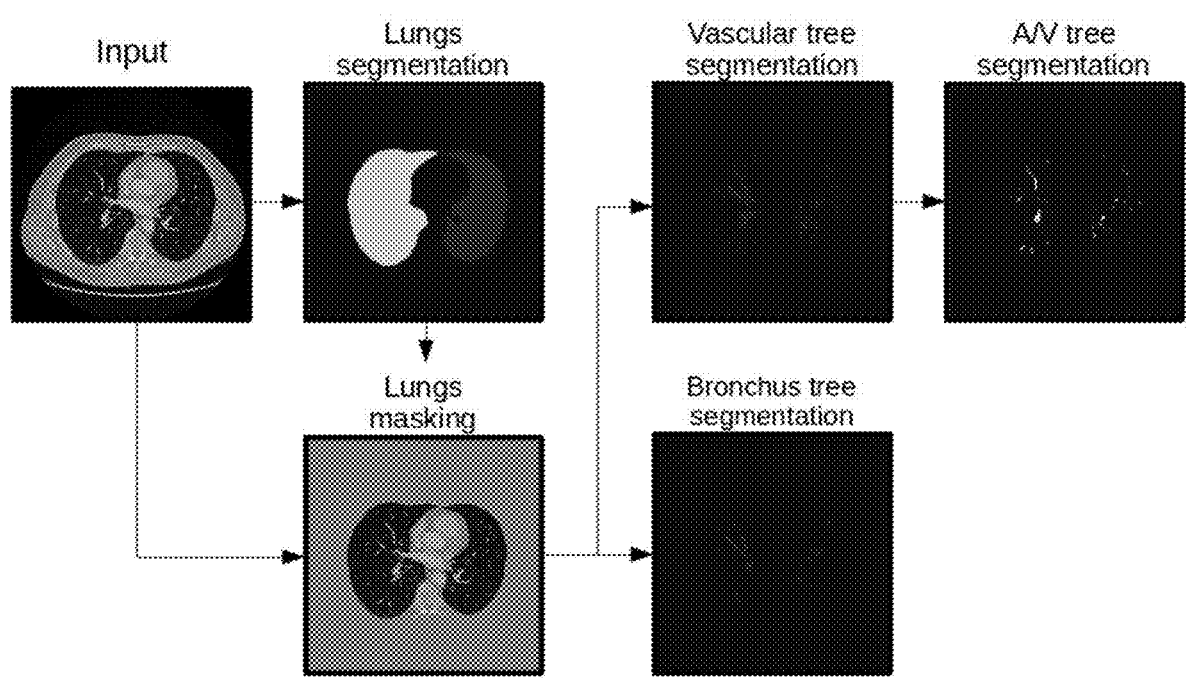
Figure 5:
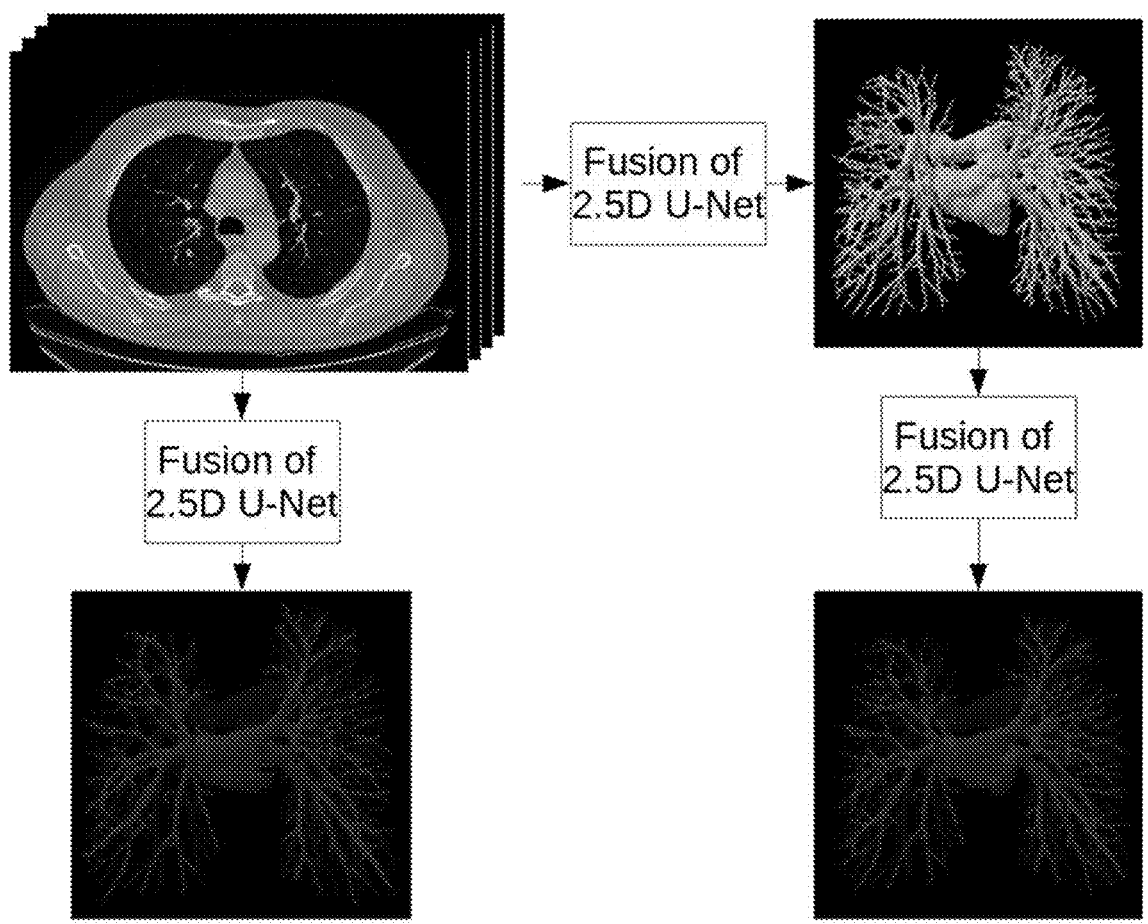
FIG. 5 illustrates two ways to achieve vascular vessel segmentation starting from multiple axial views similar to the one of FIGS. 3 and 4.
Figure 6:
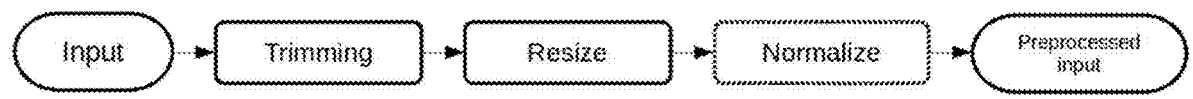
FIG. 6 shows schematically a possible initial treatment workflow which the input images are undergoing before the hierarchical workflow steps are applied.

A more refined description of the previously mentioned core features of the invention can be made in relation to FIGS. 4A and 4B.

Indeed, as shown in these figures, the hierarchically organized process is advantageously composed of four main steps.

The first step is the lungs segmentation component. The goal of this process step is to segment the left and the right lung as two classes. Once the lungs are segmented, a post-processing is applied to lungs. This post-processing step consists in the selection of the first connected component for each lung (this give the final lung segmentation) and then the convex hull of joint lungs is computed. This last operation allows to create a lung mask that will still contain the trachea and the connection between pulmonary arteries and veins and the heart. This central part of the lungs is mandatory to obtain a full segmentation.

The mask is then applied to original CT scan images in order to produce pre-processed images, and slices that do not contain the mask along the z axis are discarded.

After this step, one can conduct internal structures segmentation. Each structure can be segmented independently and can thus be computed in parallel. One component aims at the segmentation of the bronchial tree and the other component aims at the joint segmentation of pulmonary arteries and veins, in one step (FIG. 4A) or in two consecutive steps (FIG. 4B).

These segmentation components will be described in detail in the following sections.

The lungs segmentation component is composed of three elementary steps.

The first elementary step consists in the pre-processing of input CT scans volumes. The pre-processing workflow is described in FIG. 6.

The input volume values will first be trimmed between two threshold values in order to restrain the HU values range. These values (vmin and vmax) are respectively set to −1000 and 1000 to capture structures from bones to air contained in lungs. As the network take fix sized shape slice, each slice is resized to match a shape of 512×512. Finally, a normalization step is applied. This normalization step consists in mean centering and putting variance to one. This final step will be replaced with a rescaling operator that will put values between 0 and 1. The normalization will be discarded as it does not improve the convergence during training. However, for numerical stability issue values should always be between 0 and 1. This issue explains the replacement by the rescaling component. At the end, volumes with fix slice shape and with normalized values are obtained.

The second lungs segmentation elementary step which is the core step is the segmentation step with a neural network. The neural network model is based on a modified 2D U-Net (see O. Ronneberger et al., "U-Net: Convolutional Networks for Biomedical Image Segmentation", Lecture Notes in Computer Science, pp. 234-341, Springer International Publishing). The architecture used differs on two points. The number of filters is divided by two, in order to reduce the network complexity as the initial complexity is not needed to segment lungs. Moreover, in order to speed up convergence, batch-normalization layers are placed after each convolution. The final 1×1 convolutional layer is composed of 3 classes (background, right lung and left lung). The loss used during training is the weighted cross-entropy loss. For lungs, this loss is sufficient as lungs represent in the training set about 15 percent of the global volume. The optimizer used is the Adam optimizer with a learning rate of 3e-4. The network is let to training for 50 epochs and the model obtaining the best validation loss is kept.

Eventually, the last block or third elementary step of the lungs segmentation is composed of two post-processing operations. The first one which generates the final lungs segmentation involves for each lung the selection of the greatest connected component followed by a morphological hole filling. The first operation aims at avoiding including the detection of some outliers, while the second aims at filling small holes which could appear inside lungs. The second post-processing operation result will be fed to the bronchus tree and the pulmonary arteries and veins segmentation blocks (see FIG. 4A or 4B). The first post-processing step is common with the one generating the final segmentation. But, the second one is replaced with computation of the convex hull of the lungs (which are therefore regrouped into one class). This final mask will then be used to mask the input CT scan in order to concentrate the attention of the network on the inside of the lungs only. The use of convex hulls allows to keep region between lungs which is mandatory to segment the trachea on connections between heart and pulmonary arteries and veins.

The bronchus tree segmentation component is more complex than the lungs as it involves the use of multiple views. But one can again split this component into three steps.

Figure 7:
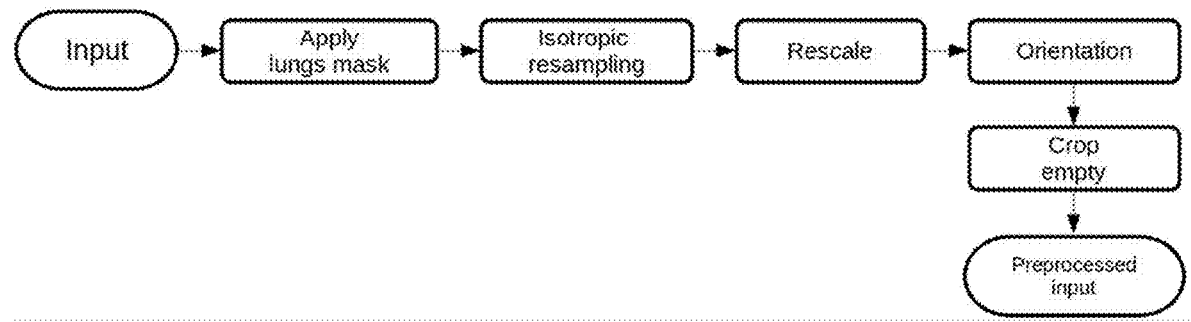
FIG. 7 illustrates the various treatment steps applied to the input images in order to obtain pre-processed images according to the invention.

The first step consists in the pre-processing of the input volume. The first three pre-processing operations presented are common for each view and only the two last operations are orientation specific. The pre-processing workflow is shown in FIG. 7.

The first step of the pre-processing chain corresponds to the masking of the input (original 2D image) by the results of the lungs segmentation. Again, this operation will restrain information to lungs and their center region only. Then an isotropic resampling is applied. This operation allows to put each volume in the same spacing. This operation is important as in the case of bronchus not only the axial view will be used but also the coronal and the sagittal views will be fed to the neural network. The last common operation for each view is the rescaling of volumes values between 0 and 1. From this last operation, an axially oriented pre-processed volume is obtained. For the orientation block, if the used network is trained on axial slices, the orientation operation acts like an identity operation. But, for sagittal and coronal training, the volume is turned so that respectively the sagittal plane and the coronal plane is aligned with the axial plane. The last operation will suppress slices/views that are not part of the lungs. This last operation is performed as it is not useful to present slices that are outside lungs and as the segmentation of the bronchial tree can always be limited to the lungs. Moreover, this cropping operation allows at prediction time to reduce computational time for both effective prediction and post-processing.

In comparison with the system/method component for the lungs segmentation, the neural network component for bronchus segmentation is slightly different.

Figure 8:
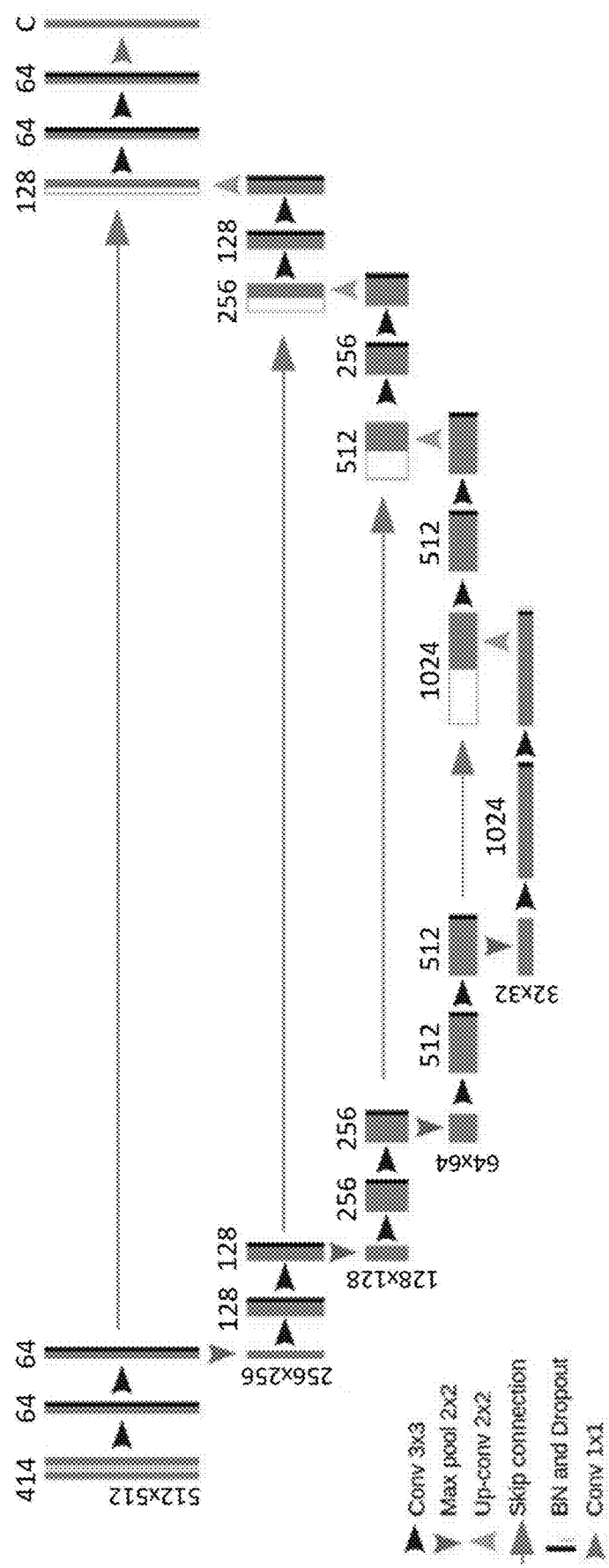
FIG. 8 is a symbolic representation of an example of 2.5D U-Net architecture used for tubular structure and elements segmentation according to the invention.

First, the number of channels is now equal to the number of channels used in the previously quoted publication (O. Ronneberger et al., "U-Net: Convolutional Networks for Biomedical Image Segmentation", Lecture Notes in Computer Science, pp. 234-341, Springer International Publishing) and most importantly, the input is now 2.5D. The attached FIG. 8 shows the architecture used for bronchus tree segmentation when implementing the method according to the invention in an exemplary way.

Indeed, each input is composed of the considered slice (pre-processed 2D image) to segment and its adjacent slices (on opposed sides of said considered slice). This addition of adjacent slices helps the network to have insight about the local 3D context all over the considered cutting plane through the concerned organ or body part (in this case the lungs). This local 3D context is important when segmenting tubular structures and improves the quality of the results.

According to the experience of the inventors, the training process should be particular in this case. So, the first training stage involves the training of the neural network fed with axial slices. This network is trained from scratch for 50 epochs. In a second time, networks fed with sagittal or coronal slices are trained by transfer learning. Final weights from the axial network are used as a starting point for other views network. This transfer allows a faster convergence and the reach of a lower loss. Furthermore, from the sagittal or coronal perspective, tubular structures are not always connected. Using transfer learning helps to mitigate this flaw. Sagittal and coronal networks are let to training for 20 epochs. As the imbalance between background and bronchial tree is higher in comparison with lungs, dice loss is used for training. Adam is also used for the training of each view with a learning rate of 3e-4.

At this point, three networks trained on the axial, sagittal and coronal views are available. To get one final volume, it is necessary according to the inventive method to merge or aggregate those three results, preferably with a fusion operation.

Figure 10:
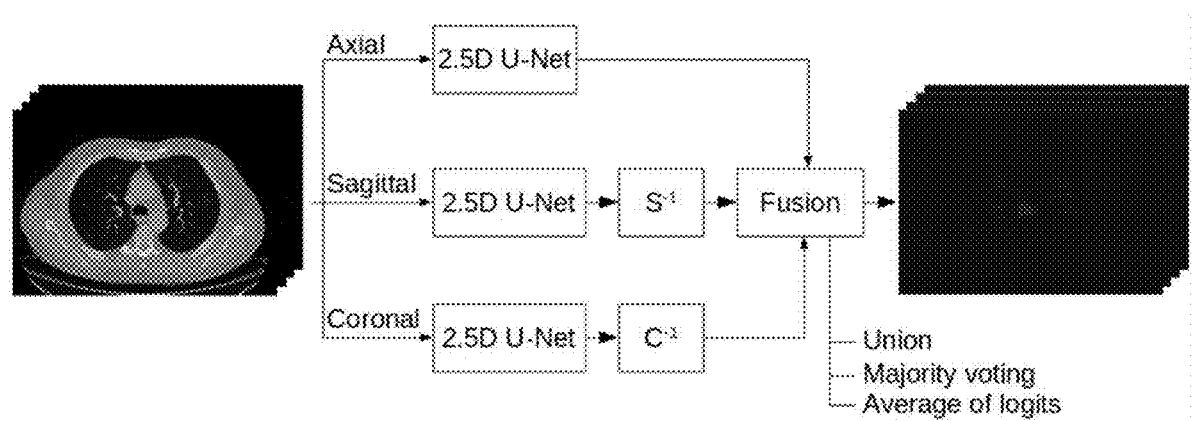
Figure 11:
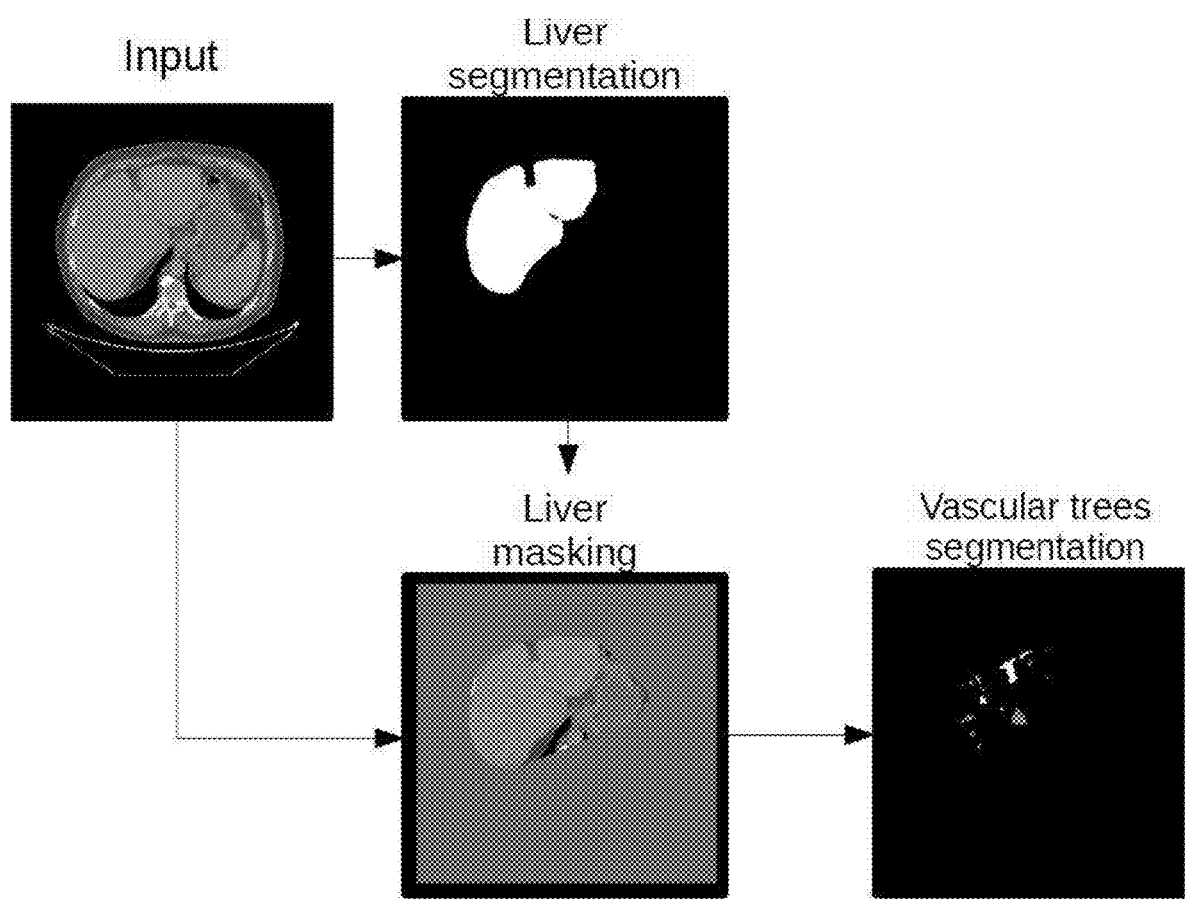
FIG. 11 is a representation similar to the one of FIG. 4A of the hierarchical workflow steps (here three steps) of the method of the invention, applied to the segmentation and labelling of the arteries and veins of the liver in a 2D image, according to an other implementation of the method according to the invention.
Figure 12:
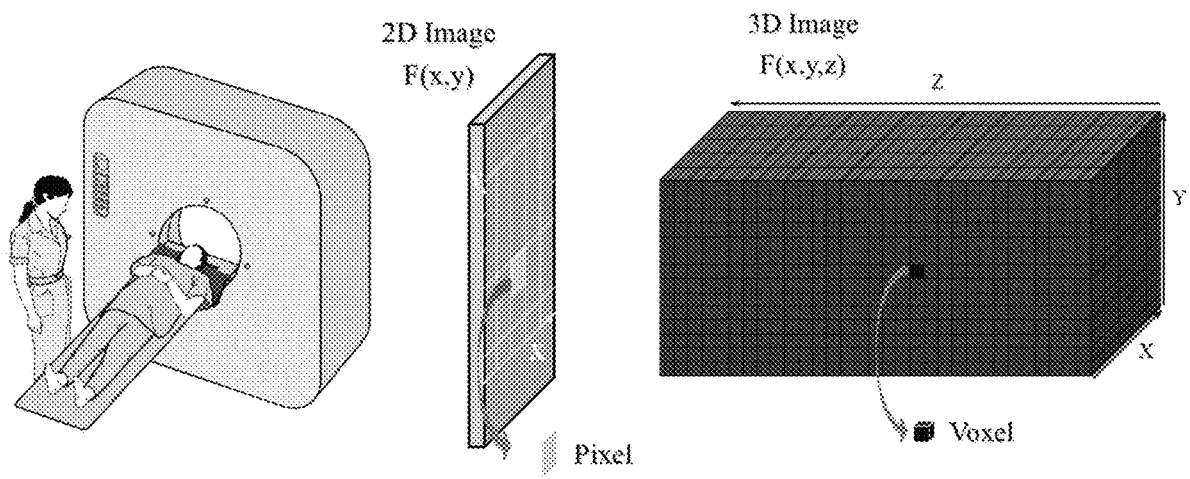
FIGS. 12 to 20 are grey level versions of the objects represented in color in FIGS. 1 to 5 and 8 to 10 respectively.
Figure 13:
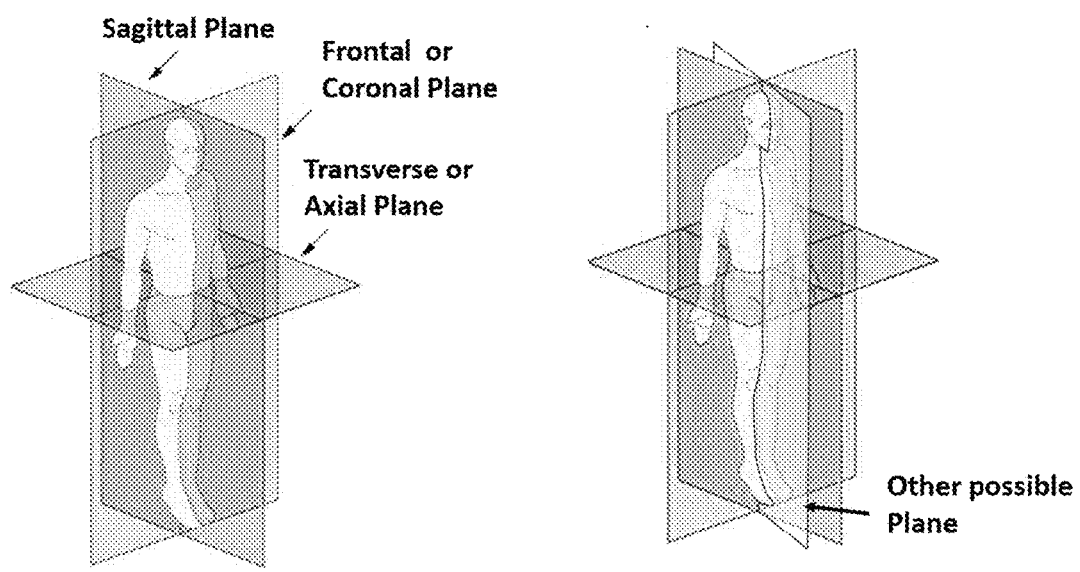
Figure 14:
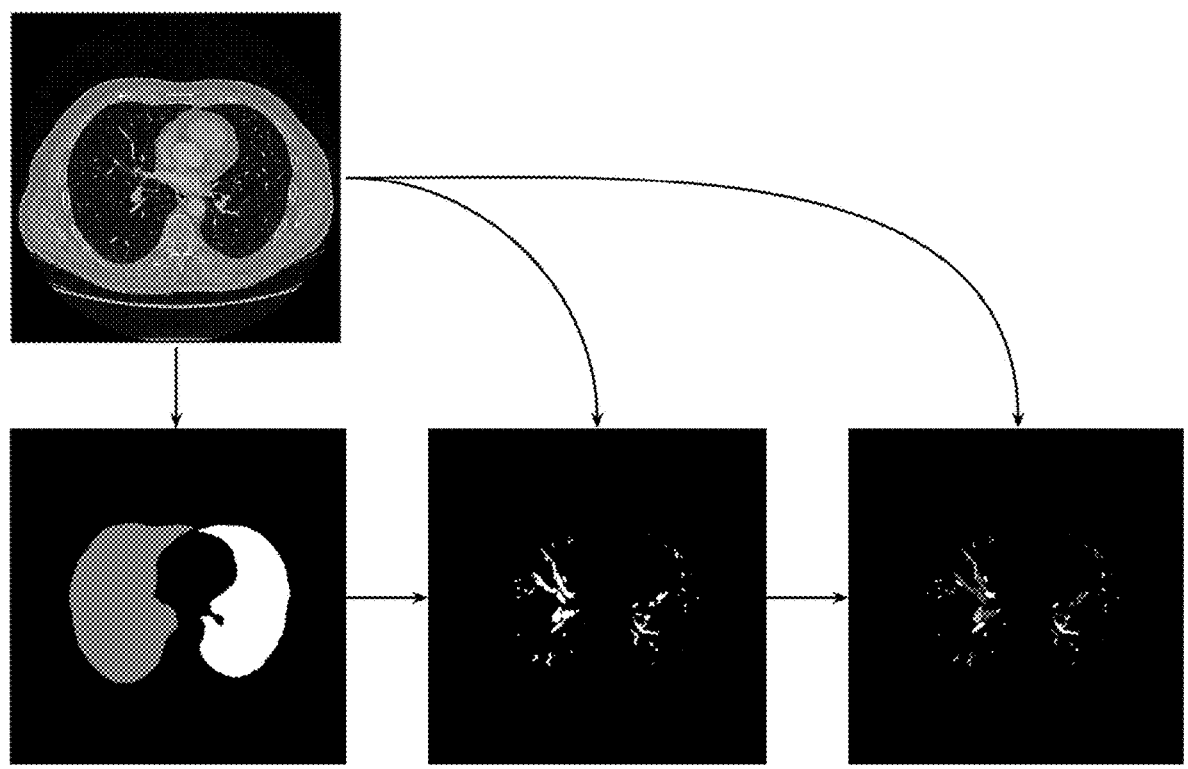
Figure 15:
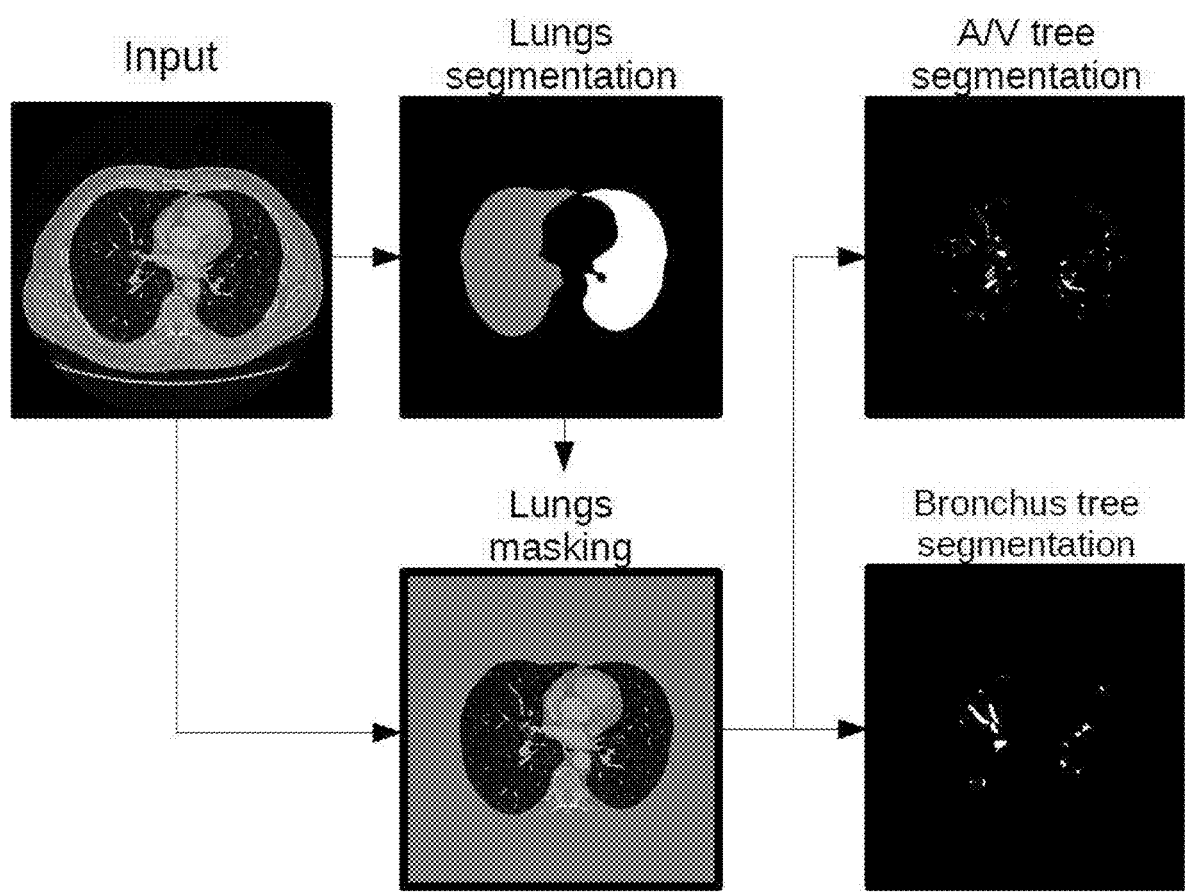
Figure 16:
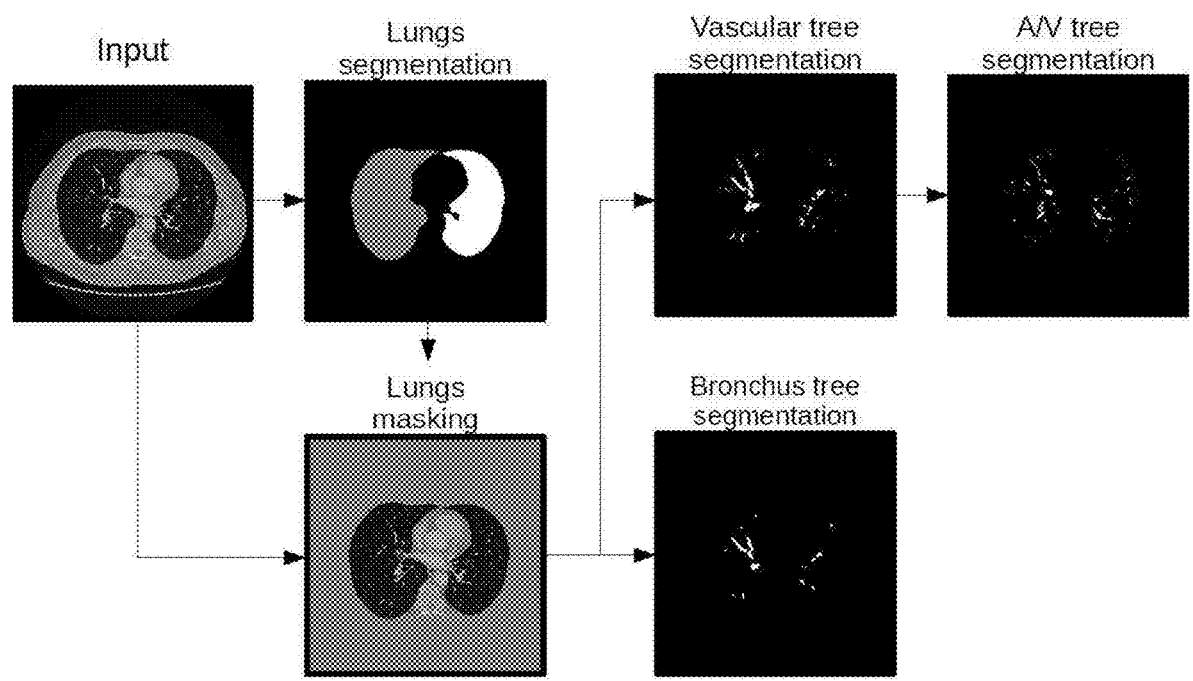
Figure 17:
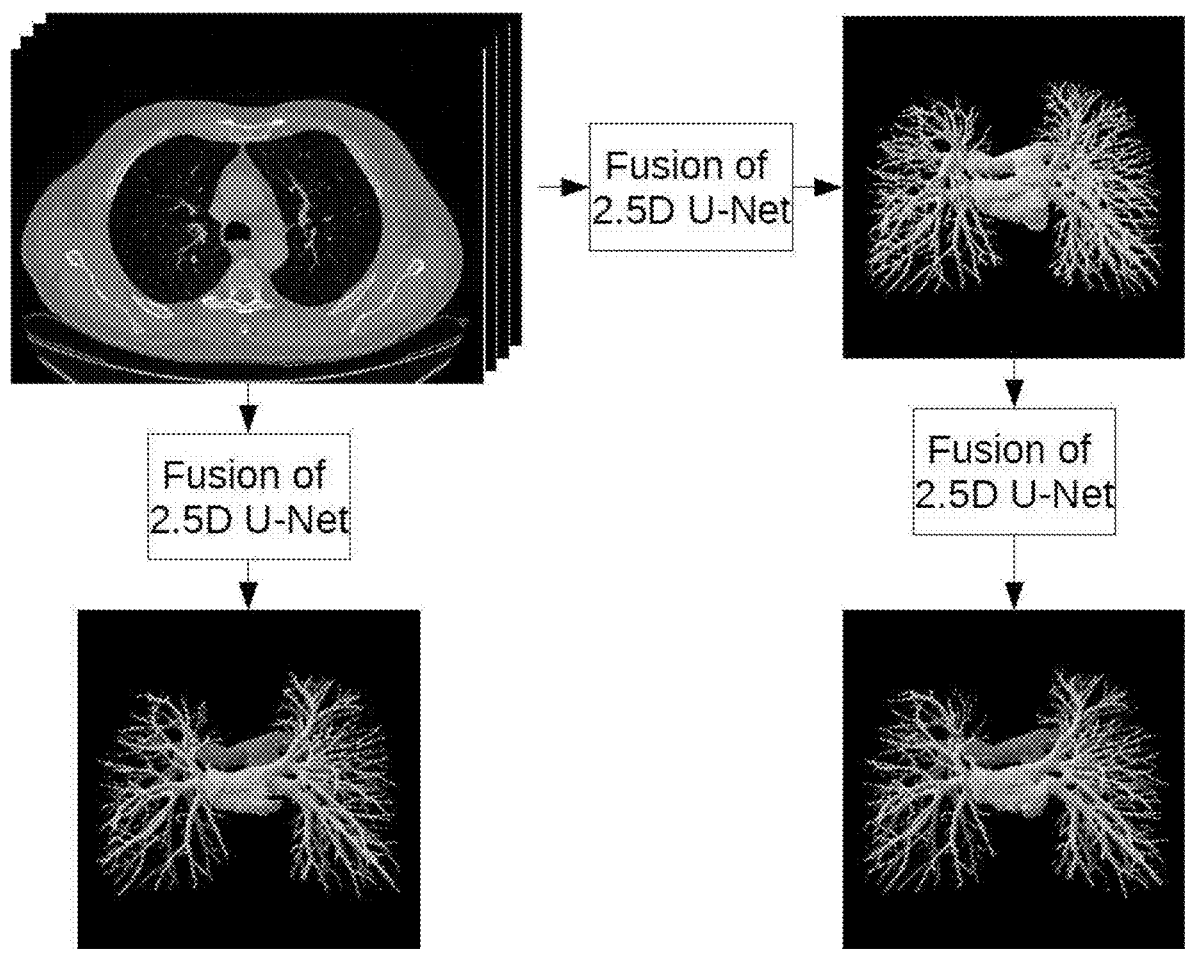
Figure 18:
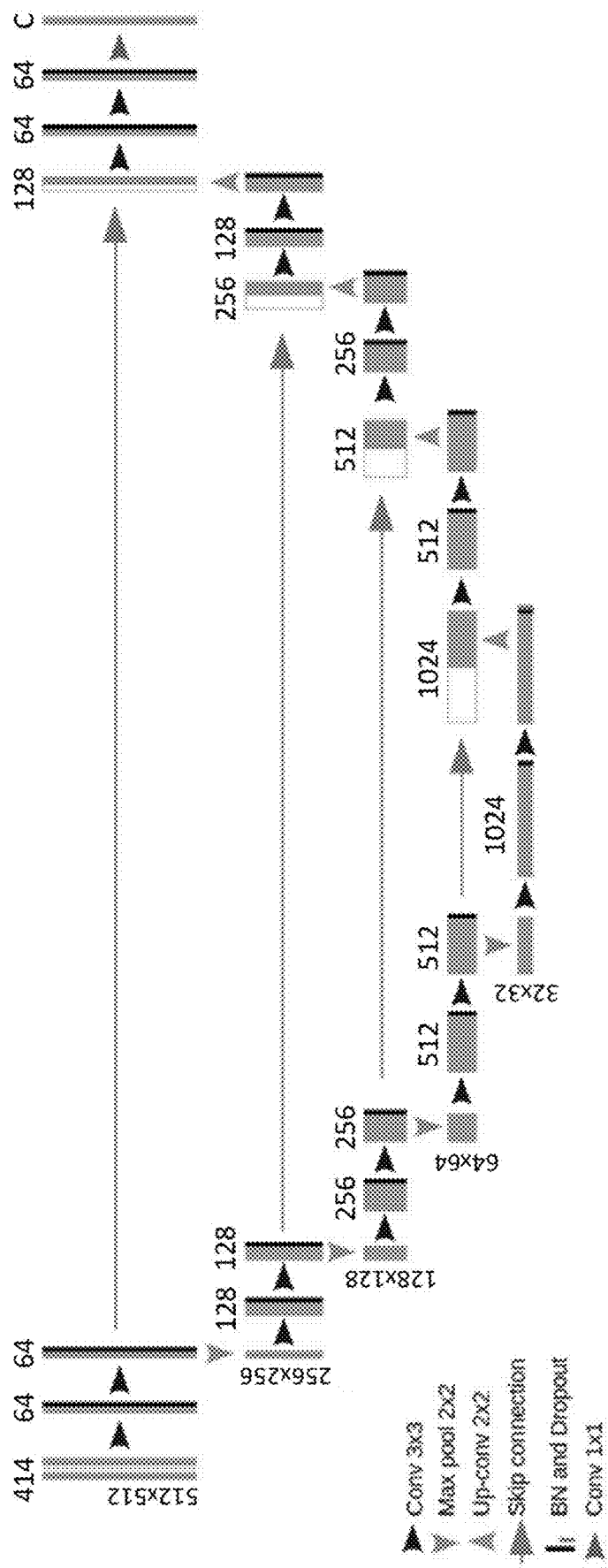
Figure 19:
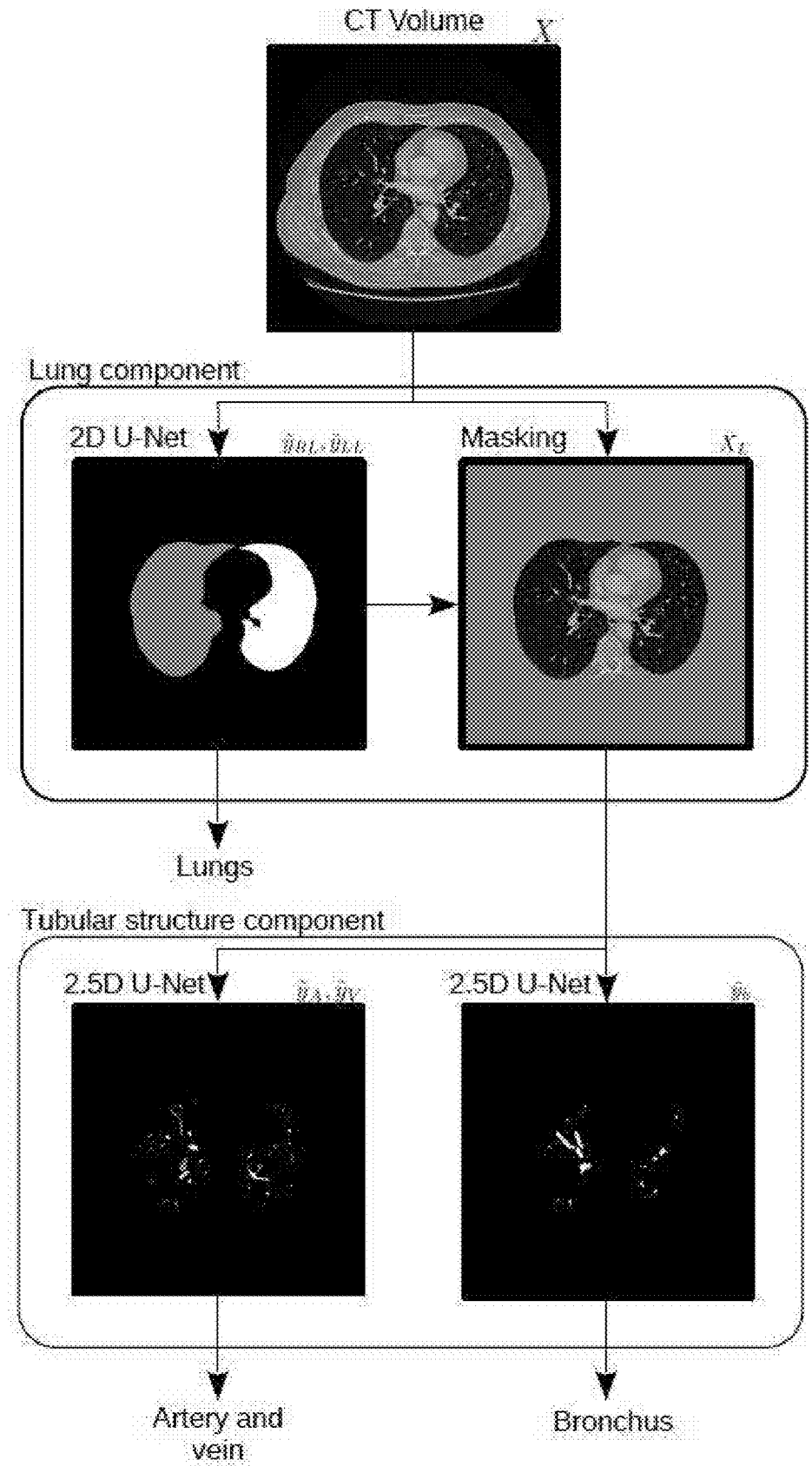
Figure 20:
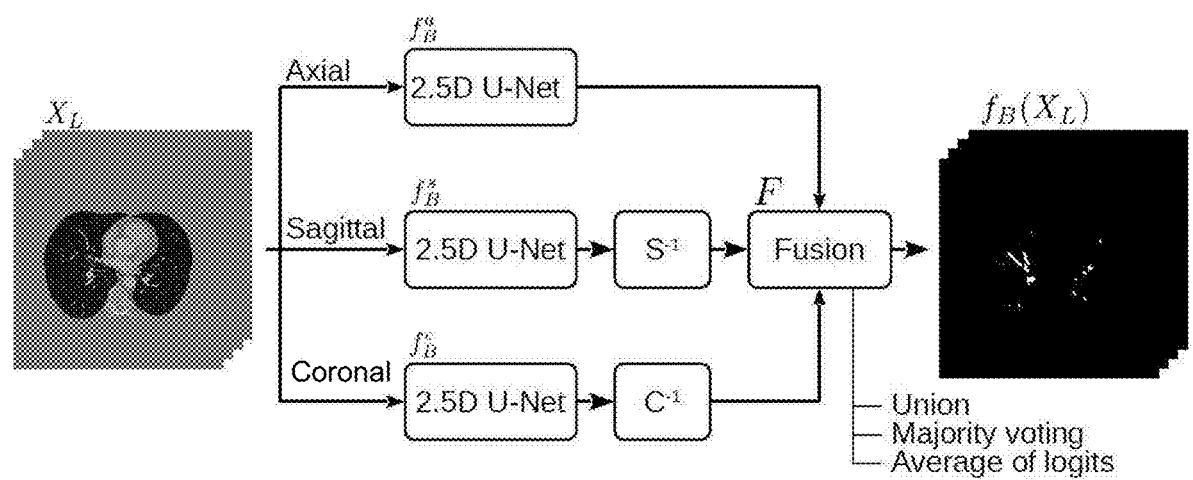

A possible fusion framework is illustrated by way of example in FIG. 10.

The inventors have mainly tested, as merging or aggregating methods, four different fusion operations, namely: fusion by union, fusion by majority voting, fusion by logits averaging, fusion by "Simultaneous Truth and Performance level estimation" (STAPLE) [S. K. Warfield et al, "STAPLE: An algorithm for the validation of image segmentation", vol. 23, pp. 903-921) and fusion by neural network.

First, fusion by union keeps every voxel mark at least one time by one of the three networks marked as part of the bronchial tree. This fusion allows to recover more part of the bronchus tree in comparison with what can each view find independently.

Quantitatively, it has been noticed that this property is reflected by a high recall in comparison with all other methods by fusion or just with the different views. This characteristic shows that each network can find useful information possibly missed by other networks. Now, the main weakness of this network is its precision which is lower than other methods. This originates from the fact that each view captures false positives (which can be artifacts for instance) and this fusion keeps everything. So, fusion by union inherits the bad properties encountered by each view.

To summarize, one can notice that union merging allows to recover all the elements detected by each neural network. Thus, the union merge will give the most exhaustive results. But, as all the detections are recovered, the false positives found by each network will also accumulate, leading to a loss in accuracy The fusion by majority voting works by keeping only voxels marked at least twice by the three networks as part of the bronchial tree. This approach, in terms of precision and recall, is the opposite of the fusion by union. Indeed, majority voting helps to get a high precision by filtering out artifacts detected by only one view. One the other hand, if one view is more efficient in a part of the bronchial tree, true positives detected by only one view will be filtered out too. This property leads to a lower recall in comparison with fusion by union. However, majority voting achieves a recall comparable to the one each view can recover.

To summarize, one can notice that the majority vote merge will have antagonistic properties compared to the union merge. This type of fusion will be selective and will filter the false positives found by a single neural network only. On the other hand, there will be a loss of true positives that were found only by a single neural network. Finally, the majority vote merge will have a better accuracy than the unions merge but it will also find fewer elements globally Fusion by logits averaging operates at logits level. Then, to have the final segmentation it is necessary to apply a threshold to those averaged logits. The main choice is generally 0.5 but this threshold could be optimized after averaging logits. Furthermore, the choice of the threshold allows to make a compromise between the fusions by union and by majority voting. Indeed, if the threshold is set to a low value, it will tend to the union fusion by selecting more voxels. On the other hand, a high value is chosen, it will be more conservative and then tend to a fusion by majority voting. This characteristic is interesting because it allows to adjust the final results depending on what properties one wants for the output.

To summarize, the logits averaging merge is a method that comes between the two methods above. Once the logits are averaged, a threshold must then be applied to obtain the final segmentation. The placement of this threshold will determine whether the precision or the number of true positives to recover is preferred.

The STAPLE fusion aims at generating a ground truth based on annotations made by multiple experts or automatic methods of a same case. It is based on an expectation-maximization algorithm and allows to optimize the recall and specificity of each segmentation with respect to the final segmentation. With respect to the present invention, this method allows to get a high precision at the cost of a loss in the recall metric in comparison with other methods. Nevertheless, this method is not suited for a low amount of raters or automatic methods.

To summarize, the fusion by STAPLE (Simultaneous truth and performance level estimation) will aim at reducing the number of false positives and false negatives. This type of merging requires more input volume than other types of merging and will therefore be more efficient when merging multiple non-orthogonal planes for example.

Finally, the neural network fusion will be able to take into account the specificities of the considered problem and will allow to optimize the fusion with respect to the examples provided. In addition, this type of fusion can allow to mitigate a certain number of artifacts that could be introduced during the transformation of the input image before prediction.

Independently of the fusion method used, orthogonal views fusion allows to gain in performance as each view will bring meaningful information in comparison with other views. Moreover, fusion leads to an improvement on the most difficult cases by reducing global fragmentation.

The last operation in the bronchus tree segmentation component is the post-processing. Multiple strategies have been explored by the inventors and only two simple operations seem to help to clean the final segmentation. The first post-processing is the selection of the greatest connected component. This method allows to clean the final results and to remove outliers. In some cases, some branches of the bronchus tree can be disconnected and be filtered out by this operation. To be less aggressive in the filtering off of connected components, the second method is adapted to filter only connected component with less than a 100 of voxels, preferably less than 50 voxels.

The pulmonary arteries and veins segmentation system/method component used by the inventors is very similar to the previously described bronchus component and borrows most of its features. Only the fusion and the post-processing steps diverge from the approach presented herein before with respect to Bronchus segmentation.

Indeed, only majority voting fusion has been considered for this pulmonary arteries and veins segmentation component as it is natural to transfer this type of fusion from binary segmentation to multi-class segmentation. But, average of logits fusion could also be used in this case. However, the threshold must then be empirically retrieved.

Moreover, arteries and veins segmentation are more fragmented in comparison with bronchus tree segmentation, thus using the greatest connected component can suppress a large part of the vascular trees. For this reason, only the second method that filters connected component with less than 100 voxels, preferably with less than 50 voxels, should be directly applied without loss of parts of the trees.

Comparative tests made by the inventors by using several known metrics (dice score, precision, recall, AsSD, Hausdorff distance, skeleton embedding precision, recall and in solid sphere metrics) have shown that the method according to the invention, when using the same cases for training as other 2D and 3D methods from the state of the art, outperforms or at least equals the latters, while using less resources and/or being quicker.

A first practical example of the method according to the invention and applied by the inventors to tubular structure segmentation of lungs is described in more detail hereinafter, in relation to FIGS. 8, 9 and 10.

This first example consists in a 2-step cascaded framework for Lungs, Bronchus, pulmonary Artery and Vein segmentation (called LuBrAV in short). The applied method can be summarized as follows: first, right and left lungs segmentation is performed using a slightly modified 2D U-Net architecture. Then, the input CT scan is masked with the convex hull of lungs and is provided to a three-paths structure made of 2.5D fully convolutional networks along axial, coronal and sagittal slices to extract tubular components.

The proposed method is divided into two steps: lung extraction, followed by tubular structure segmentation.

Figure 9:
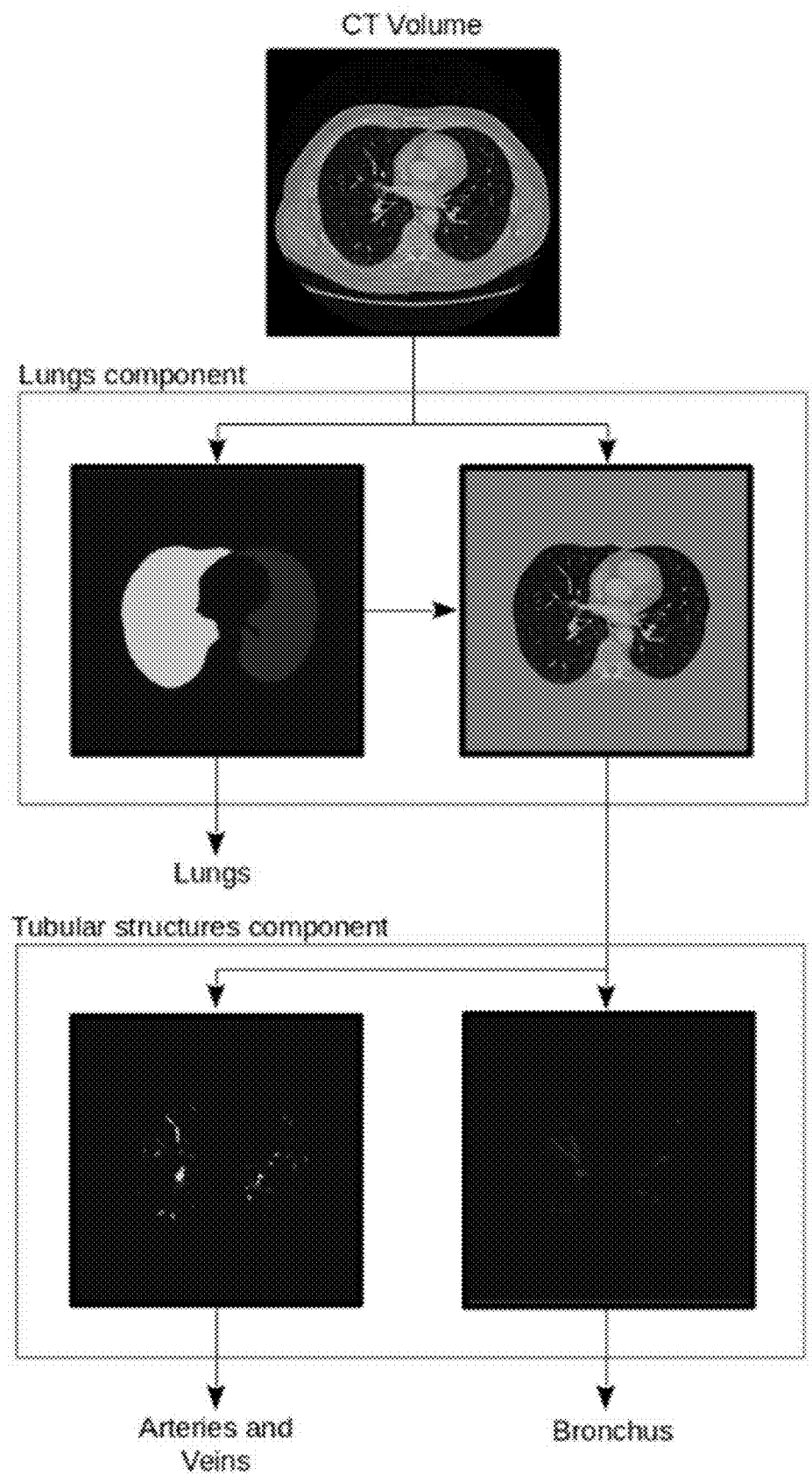
FIG. 9 is a more precise schematical representation of the cascaded and hierarchical framework of the method and the system architecture of the invention in relation to the embodiment shown in FIG. 4A, and, FIG. 10 shows schematically examples of the fusion workflow and architecture according to the invention.

FIG. 9 shows the flowchart of the proposed approach, namely a first component which is dedicated to the segmentation of lungs and a second component which segments tubular structures using the masked input.

Here X is considered as an nz×nx×ny thoracic CT-scan volume. The first step aims at segmenting right and left lungs. The idea is to restrain the volume to lungs only, as lungs represent only about 15% of the global volume. Thus, a large majority of the volume contains irrelevant information for tubular structure segmentation. The estimation of lungs masks can be defined as:

$$\tilde{y}_{RL}, \tilde{y}_{LL} = f_L(X) \quad (1)$$

where $\tilde{y}_{RL}$ and $\tilde{y}_{LL}$ represent the right and left lung predicted masks, respectively; $f_L$ is an operator allowing to segment and classify both lungs. To restrain the volume to the region of interest, we define the following masked volume:

$$X_L = \text{Hull}(\tilde{y}_{RL} \cup \tilde{y}_{LL}) \cdot X \quad (2)$$

where Hull( ) is the convex hull operator and the element-wise product. Thus, $X_L$ contains non-constant values only inside and between lungs. This operation allows to restrain X to the lungs without loosing their central part, which contains the trachea and heart connections. These are mandatory to understand properly the vascularization of both lungs. After having reduced the amount of irrelevant information, two operators fB and fAV are applied for bronchus, artery and vein segmentation respectively, $$\tilde{y}_b = f_B(X_L) \quad (3)$$

$$\tilde{y}_A, \tilde{y}_V = f_{AV}(X_L) \quad (4)$$

where $\tilde{y}B$, $\tilde{y}A$, $\tilde{y}V$ denote the bronchus, arteries and veins trees predicted masks, respectively.

The lung component is composed of two parts: left and right lung extraction and CT-scan masking with the convex hull of the extracted lungs. The lungs extraction is performed using a 2D U-Net network. Its architecture is based on [9] with the additional batch-normalization layers after each double convolution and up sampling convolution blocks [15]. This modification allowed to improve convergence. During training, the weighted cross entropy loss was used as a loss function to mitigate unbalancing. The largest connected component of each class is retained in order to filter possible artifacts. A convex hull operation is then applied to merge left and right lungs. Eventually, the result of this operation is used to mask the input CT and to restrain information to lung area only (Equ. (2)).

For the tubular structure component, an approach based on the combination of 2.5D U-Net applied to the axial, sagittal and coronal views is proposed. The 2.5D architecture used is represented in FIG. 8 (C represents the number of classes).

The used 2.5D U-Net considers, in addition to the current slice to segment, the k previous and following adjacent slices. Neighbor slices allow to gather 3D local information which helps to segment tubular structures. The number of final output channels, C, depends on the task considered: two for bronchus or three for artery and vein segmentation. This architecture is then used along multiple views (see FIG. 10).

As shown on FIG. 10, three parallel 2.5D U-Net are used to learn tubular structure representation along orthogonal views, and merged as a single output.

Using orthogonal views allows to further enrich 3D contextual information. Indeed, each view can capture different relevant information and might find tubular structures missed by the two other views. Segmentations derived from each view are then merged to obtain the final output. For instance, for bronchus, the output of the component is defined as:

$$f_B(X_L) = F[f^a_B(X_L), f^s_B(X_L), f^c_B(X_L)] \quad (5)$$

where F is a fusion operator and faB, fsB, fcB are segmentation operators using 2.5D U-Net along the axial, sagittal and coronal views respectively. Depending on the number of classes to segment, one can consider union, majority voting (MV) and logits averaging (LA) for the fusion operator. In the case of tubular structures, to mitigate unbalance between tubular classes and the background, the generalized Dice loss is used as a training loss for each view. Dice loss is more suited than weighted cross entropy as the lung tubular structures represent a tiny part of the total volume, in comparison with lungs.

To evaluate the inventive method, the inventors collected 193 chest CT scans from several hospitals. As a consequence, these data were acquired on scanners from different manufacturers and according to various protocol, thus reflecting the broad variability of daily routine clinical data. The slice spacing of these CT volumes varies from 0.625 to 2.0 mm No selection has been made on the collected CT-scans meaning that the dataset contains pathological lungs (masses, pectus excavatum, . . . ) and post surgery lungs. 185 out of all the images were fully annotated by six expert radiology technicians who delineated the five previously mentioned classes. Eight scans were annotated by all the six experts in order to compare the performance of the present method with respect to the inter-rater variability. The 185 cases dataset was split into three sets containing 118, 30 and 37 cases corresponding to the training, validation and testing sets, respectively.

To assess the segmentation quality, several complementary metrics were considered namely Dice score, the Average symmetric Surface Distance (AsSD) and the Hausdorff distance. The skeleton embedding method proposed in [5] was also considered: it allows to compute the precision and recall of the centerline of tubular structures. Centerline evaluation allows to avoid the influence of vessel diameters and thus to evaluate equally thin and thick vessels. Eventually, the presented method was assessed on the eight cases annotated by each expert. To compare with multiple experts, we considered the intersection (resp. the union) of all the expert segmentation to compute recall (resp. precision) by skeleton embedding. It was decided to compute recall on the intersection of all the expert segmentation in order to assess that the method can at least detect the structures that all experts agreed on. The precision was computed on the union of expert segmentation to avoid false positives due to inter-rater variation.

Two experiments were conducted. First, the proposed approach was evaluated with various fusion strategies and the performance compared with a standard 2D U-Net and 3D U-Net (Table hereinafter). The 2D U-Net takes as input 2D axial slices and gives as output the five considered classes. The 3D U-Net is equivalent to the one proposed in [5].

| Structures | Dice | AsSD | Haus. | Prec | Reca |
| --- | --- | --- | --- | --- | --- |
| Bronchus | | | | | |
| Axial | 78.0 ± 3.3 | 1.20 ± 0.3 | 37.2 ± 12.7 | 85.2 ± 5.0 | 69.6 ± 7.6 |
| Union | 78.1 ± 3.3 | 1.16 ± 0.3 | 40.0 ± 15.8 | 78.4 ± 6.0 | 76.1 ± 7.1 |
| MV | 78.1 ± 3.1 | 1.21 ± 0.3 | 36.4 ± 10.8 | 87.9 ± 4.9 | 68.9 ± 7.9 |
| LA | 78.5 ± 3.2 | 1.21 ± 0.3 | 36.3 ± 10.8 | 88.8 ± 4.7 | 69.3 ± 7.9 |
| U-Net 2D | 74.8 ± 5.3 | 1.99 ± 0.7 | 78.2 ± 28.2 | 75.9 ± 9.7 | 59.6 ± 9.1 |
| U-Net 3D | 74.3 ± 3.1 | 1.84 ± 0.5 | 65.3 ± 13.8 | 77.4 ± 6.9 | 67.3 ± 8.5 |
| Arteries | | | | | |
| Axial | 77.3 ± 5.8 | 1.45 ± 0.6 | 36.4 ± 11.9 | 77.9 ± 10.1 | 66.5 ± 12.4 |
| MV | 78.9 ± 5.6 | 1.34 ± 0.5 | 35.6 ± 11.4 | 80.0 ± 10.2 | 67.2 ± 14.0 |
| U-Net 2D | 71.7 ± 12.8 | 2.62 ± 1.4 | 48.9 ± 23.0 | 60.9 ± 10.5 | 50.0 ± 14.4 |
| U-Net 3D | 75.3 ± 6.2 | 1.41 ± 0.5 | 37.2 ± 14.5 | 69.7 ± 11.7 | 65.7 ± 15.7 |
| Veins | | | | | |
| Axial | 75.4 ± 5.9 | 1.52 ± 0.7 | 35.4 ± 13.5 | 73.7 ± 10.4 | 72.3 ± 11.0 |
| MV | 76.9 ± 5.5 | 1.34 ± 0.6 | 32.1 ± 12.2 | 77.4 ± 10.1 | 71.2 ± 12.7 |
| U-Net 2D | 65.5 ± 13.3 | 2.78 ± 1.4 | 60.2 ± 17.6 | 60.1 ± 11.7 | 55.5 ± 13.3 |
| U-Net 3D | 72.0 ± 6.7 | 1.92 ± 0.75 | 53.4 ± 15.1 | 70.6 ± 10.6 | 67.9 ± 14.6 |

In the above table, each presented score is the mean standard deviation over the test set (distances are given in mm) The scores are: Dice score, Average symmetric Surface Distance (AsSD), Hausdorff distance (Haus.), skeleton embedding precision (Prec) and skeleton embedding recall (Reca). The logits average is thresholded with the best value found for Dice score on the validation set by grid search between 0.1 and 0.5.

Lung segmentation is not evaluated in the previous table as the presented framework and the multi-class 2D U-Net obtained similar high Dice score (>0.98), low AsSD (<1 mm) and a Hausdorff distance inferior to mm Fusion methods offer different properties for the final segmentation. Fusion by union will give a high recall at the cost of a lower precision. Majority voting fusion will provide a high precision and a low recall. Finally, the choice of the threshold for logits average will offer a compromise between recall and precision. For artery and vein, only the majority voting fusion has been assessed as this fusion naturally transfers on multi-class problems. The proposed method outperforms both 2D and 3D baselines by a large margin, especially on arteries and veins. Baseline methods suffer from a lack of precision and recall compared to the proposed framework. This difference can be explained by the reduction of X to XL and the usage of multiple views. Furthermore, 2D U-Net often provides inconsistent connection between heart and lung entries. Due to the multiple view and narrowed space to segment, the present method keeps being consistent between heart and lung entries. Moreover, the usage of majority voting fusion allows to reduce class confusions between pulmonary arteries and veins.

Finally, the performances of method according to the invention, on the one hand, the performances of the union (precision) and the intersection (recall) of six expert segmentations, on the other hand, were also compared (Table here underneath):

| (a) Bronchus | | | | |
| --- | --- | --- | --- | --- |
| | | Bronchus | | |
| Metrics | Axial | Union | MV | LA |
| Precision | 98.9 ± 0.8 | 97.7 ± 2.5 | 99.1 ± 0.1 | 98.5 ± 0.4 |
| Recall | 86.9 ± 4.9 | 94.4 ± 2.3 | 89.0 ± 4.3 | 94.6 ± 2.4 |
| F1 | 92.5 ± 2.8 | 95.5 ± 2.0 | 93.7 ± 2.4 | 96.5 ± 1.1 |

-continued

| (b) Pulmonary arteries and veins | | | | |
| --- | --- | --- | --- | --- |
| | Arteries | | Veins | |
| Metrics | Axial | Union | MV | LA |
| Precision | 98.2 ± 1.4 | 98.8 ± 1.2 | 98.5 ± 0.8 | 98.9 ± 0.9 |
| Recall | 73.1 ± 6.9 | 85.6 ± 5.5 | 79.8 ± 8.5 | 87.6 ± 5.2 |
| F1 | 83.6 ± 4.4 | 91.7 ± 3.1 | 87.9 ± 4.8 | 92.4 ± 2.9 |

The results are given as mean±standard deviation in percentage for each metric.

The performances obtained on the multi-raters dataset are better than performance obtained on the test set where each image was annotated by only one expert. This performance difference is due to the fact that different experts will find different tubular structures at the periphery of the lungs. Thus, this second experiment was conducted to mitigate the inter-rater variation during testing and give a more accurate estimation of precision and recall. Fusion helps in each case to improve both precision and recall in terms of mean and standard deviation. These experiments illustrate the capability of the present method and system to segment tubular structures of lungs with a high precision. FIG. 4 presents 3D reconstructions obtained from reference, axial networks and majority voting fusion. Majority voting fusion on arteries and veins can avoid some confusions between arteries and veins (see the green circle).

In brief, a 2.5D cascaded approach to segment both aerial and vascular tubular lung structures is proposed. The two-step pipeline helps neural networks to focus on tubular structures segmentation. Each tubular module takes advantage of the complementary nature of each orthogonal view through fusion. Recall is always superior when considering the fusion of multiple views in comparison to axial only and other views in general. This shows that networks trained on different views can capture relevant information that might be missed on a single view. Moreover, the use of fusion allows in some cases to avoid artery/vein confusion. Finally, the proposed frame-work can also partially handle situations where a disease modifies the structural aspect of tubular structures (vessels passing through pulmonary nodules, pectus excavatum, . . . ).

As a second practical example, the application of the inventive method and system to the segmentation of liver and vascular vessels interacting with the liver will ow be described.

The main classes considered here are: liver, hepatic vein, hepatic artery and portal vein. As for the previous example with the lung, a 2-step approach is considered: first the liver will be segmented by a first component and then the input Computed Tomography scan (CT scan) will be restricted to the liver convex hull area only. Then, a second component will segment the vascular vessels. Adaptation needed for each component will be given in the document. The used database for abdominal structures segmentation is composed of 148 cases (119 will be used for training and 29 for testing).

The liver segmentation was tested by the inventors, at first, with the same framework presented in the report on the hierarchical approach. The main change between the two approaches comes from the trimming operation where vmin and vmax were adjusted to the abdominal area vmin and vmax were set to −100 and 400 respectively.

As the liver is generally more complex to segment in comparison with lungs due to common boundaries with other organs sharing overlapping Hounsfield Unit (HU), it was decided to improve the segmentation of the liver using two levers. First, not only the axial plane for the segmentation is considered, but also coronal and sagittal planes. This modification implies the usage of a different pre-processing pipeline which corresponds to the one illustrated on FIG. 7, but wherein the step «Apply lung mask» is replaced by a «Trimming» step.

On the other hand, to mitigate boundary leakage into neighbouring organs, the segmentation of the following organs in addition to liver segmentation is considered: colon, gallbladder, right kidney, left kidney, pancreas, spleen, stomach, heart, right and left Lungs. As these organs might be in contact with the liver hull, leakage toward them will be reduced A training phase was conducted in the same way as presented previously in relation to the 2.5D multi-view hierarchical approach. The axial network was trained from scratch while sagittal and coronal networks started from axial's final weights.

The fusion operation used is the majority voting as multiple classes are merged. The table hereafter contains quantitative results obtained for each organ. Heart and lungs were not kept for the evaluation as they are not going to be use as a starting point for experts.

| Structures | Dice (%) | AsSD (mm) | Hausdorff distance (mm) |
| --- | --- | --- | --- |
| Colon | 63.3 ± 25.8 | 19.0 ± 20.6 | 108.8 ± 82.5 |
| Gallbladder | 64.5 ± 33.3 | 3.80 ± 5.72 | 18.5 ± 15.4 |
| Right kidney | 86.7 ± 21.1 | 4.6 ± 16.0 | 18.3 ± 21.3 |
| Left kidney | 85.9 ± 19.5 | 4.64 ± 16.0 | 18.2 ± 22.6 |
| Liver | 92.0 ± 11.5 | 3.41 ± 4.5 | 9.9 ± 31.1 |
| Pancreas | 68.2 ± 24.4 | 3.51 ± 3.57 | 23.7 ± 14.3 |
| Spleen | 92.7 ± 8.4 | 1.49 ± 1.99 | 14.2 ± 15.1 |
| Stomach | 78.7 ± 13.9 | 3.99 ± 2.87 | 48.8 ± 18.9 |

Each presented score is the mean±standard deviation over the test set (distances are given in mm and Dice scores in percentage).

In comparison with lungs, one can see that the agreement between the method and one expert is weaker. Nevertheless, liver maintains a high overlapping with the reference. Moreover, scores standard deviation are high for each structure showing variability in the agreement with expert segmentation. For organs segmentation, a simple post-processing was applied to each class which is the selection of the greatest connected component allowing to filter out outliers.

Liver vascular vessels contains the following structures: portal vein, hepatic vein and hepatic artery. The component allowing to segment hepatic tubular structures borrows almost every-thing from the pulmonary artery and vein component. The main difference lies in the values vmin and vmax that were set to −100 and 400 respectively.

Like for the bronchus or pulmonary artery and vein component, the input of the network is masked with the convex hull of the organ of interest which is in this case the liver. Further-more, no post-processing was applied to the resulting segmentation. A quantitative evaluation is presented in the following table:

| Structures | Dice (%) | AsSD (mm) | Hausdorff distance (mm) |
| --- | --- | --- | --- |
| Artery | | | |
| Axial | 65.1 ± 19.2 | 4.96 ± 4.23 | 61.8 ± 39.9 |
| Majority voting | 68.0 ± 20.1 | 3.47 ± 2.89 | 54.8 ± 42.0 |
| Hepatic vein | | | |
| Axial | 59.7 ± 22.4 | 4.41 ± 4.56 | 50.7 ± 24.7 |
| Majority voting | 67.2 ± 19.3 | 3.64 ± 5.11 | 46.4 ± 20.3 |
| Portal vein | | | |
| Axial | 67.3 ± 16.8 | 4.12 ± 4.86 | 85.3 ± 36.0 |
| Majority voting | 73.2 ± 15.1 | 2.28 ± 1.55 | 53.6 ± 33.3 |

Each presented score is the mean±standard deviation over the test set (distances are given in mm and Dice scores in percentage). Metrics for artery, hepatic vein and portal vein are only computed inside liver convex hull envelop.

For every metrics and every structure, the fusion by majority voting obtains better mean scores in comparison with the axial view only for nearly the same standard deviation. This difference shows again the relevance of the usage of a fusion method for this kind of segmentation. To extend further the analysis, we will split vessels results in two parts: vein tubular structures and artery tubular structure.

This second example shows that the method according to the invention, when applied to the liver and the vascular vessels interacting with it, with some slight modification with respect to the first example, can provide the segmentation of: colon, gallbladder, right kidney, left kidney, pancreas, spleen, stomach, heart, right and left lungs, portal vein, hepatic vein and hepatic artery.

In relation to the recognition of the veins and the arteries, the number of false positives remains low in comparison with true positives.

The following references have been quoted previously in the present specification (by their respective number between brackets) and their content and teachings are incorporated herein as examples of state of the art knowledge:

[1] P. Lo, B. van Ginneken, J. M. Reinhardt, Y. Tarunashree, P. A. de Jong, B. Irving, C. Fetita, M. Ortner, R. Pinho, J. Sijbers, M. Feuerstein, A. Fabijanska, C. Bauer, R. Beichel, C. S. Mendoza, R. Wiemker, J. Lee, A. P. Reeves, S. Born, O Weinheimer, E. M. van Rikxoort, J. Tschirren, K. Mori, B. Odry, D. P. Naidich, I. J. Hart-mann, E. A. Hoffman, M. Prokop, J. H. Pedersen and M. de Bruijne, "Extraction of Airways From CT (EXACT'09)," IEEE Transactions on Medical Imaging, vol. 31, no. 11, pp. 2093-2107, November 2012.

[2] D. Jin, Z. Xu, A. P. Harrison, K. George, and D. J. Mollura, "3D Convolutional Neural Networks with Graph Refinement for Airway Segmentation Using Incomplete Data Labels," in Machine Learning in Medical Imaging, vol. 10541, pp. 141-149. Springer International Publishing, Cham, 2017.

[3] Y. Qin, M. Chen, H. Zheng, Y. Gu, M. Shen, J. Yang, X. Huang, Y. Zhu, and G. Yang, "AirwayNet: A Voxel-Connectivity Aware Approach for Accurate Airway Segmentation Using Convolutional Neural Networks," in Medical Image Computing and Computer Assisted Intervention MICCAI 2019, vol. 11769, pp. 212-220. Springer International Publishing, Cham, 2019.

[4] A. G. Juarez, H. A. W. M. Tiddens, and M. de Bruijne, "Automatic Airway Segmentation in chest CT using Convolutional Neural Networks," arXiv:1808.04576 [cs], August 2018, arXiv: 1808.04576.

[5] T. Zhao, Z. Yin, J. Wang, D. Gao, Y. Chen, and Y. Mao, "Bronchus Segmentation and Classification by Neural Networks and Linear Programming," in Medical Image Computing and Computer Assisted Intervention MICCAI 2019, vol. 11769, pp. 230-239. Springer International Publishing, Cham, 2019.

[6] J. Yun, J. Park, D. Yu, J. Yi, M. Lee, H. J. Park, J. Lee, J. B. Seo, and N. Kim, "Improvement of fully automated airway segmentation on volumetric computed tomographic images using a 2.5 dimensional convolutional neural net," Medical Image Analysis, vol. 51, pp. 13-20, January 2019.

[7] Q. Meng, H. R. Roth, T. Kitasaka, M. Oda, J. Ueno, and K. Mori, "Tracking and Segmentation of the Airways in Chest CT Using a Fully Convolutional Network," in Medical Image Computing and Computer-Assisted Intervention MICCAI 2017, vol. 10434, pp. 198-207. Springer International Publishing, Cham, 2017.

[8] C. Wang, Y. Hayashi, M. Oda, H. Itoh, T. Kitasaka, A. F. Frangi, and K. Mori, "Tubular Structure Segmentation Using Spatial Fully Connected Network with Radial Distance Loss for 3D Medical Images," in Medical Image Computing and Computer Assisted Intervention MICCAI 2019, vol. 11769, pp. 348-356. Springer International Publishing, Cham, 2019.

[9] O. Ronneberger, P. Fischer, and T. Brox, "U-Net: Convolutional Networks for Biomedical Image Segmentation," in Lecture Notes in Computer Science, pp. 234-241. Springer International Publishing, 2015.

[10] Y. Wang, Y. Zhou, W. Shen, S. Park, E. Fishman, and A. Yuille, "Abdominal multi-organ segmentation with organ-attention networks and statistical fusion," Medical image analysis, vol. 55, pp. 88-102, 2019.

[11] M. Perslev, E. B. Dam, A. Pai, and C. Igel, "One Network to Segment Them All: A General, Lightweight System for Accurate 3D Medical Image Segmentation," in Medical Image Computing and Computer Assisted Intervention MICCAI 2019, vol. 11765, pp. 30-38. Springer International Publishing, Cham, 2019.

[12] H. Cui, X. Liu, and N. Huang, "Pulmonary Vessel Segmentation Based on Orthogonal Fused U-Net++ of Chest CT Images," in Medical Image Computing and Computer Assisted Intervention MICCAI 2019, vol. 11769, pp. 293-300. Springer, 2019.

[13] P. Nardelli, D. Jimenez-Carretero, D. Bermejo-Pelaez, M. J. Ledesma-Carbayo, F. N. Rahaghi, and R. Estepar, "Deep-learning strategy for pulmonary artery-vein classification of non-contrast CT images," in 2017 IEEE 14th International Symposium on Biomedical Imaging (ISBI 2017), Melbourne, Australia, April 2017, pp. 384-387.

[14] P. Nardelli, D. Jimenez-Carretero, D. Bermejo-Pelaez, G. R. Washko, F. N. Rahaghi, M. J. Ledesma-Carbayo, and R. Estpar, "Pulmonary ArteryVein Classification in CT Images Using Deep Learning," IEEE Transactions on Medical Imaging, vol. 37, no. 11, pp. 2428-2440, November 2018.

[15] S. Ioffe and C. Szegedy, "Batch normalization: Accelerating deep network training by reducing internal covariate shift," in Proceedings of the 32nd International Conference on International Conference on Machine Learning-Volume 37. ICML'15, pp. 448-456, JMLR.org.

[16] C. Sudre, W. Li, T. Vercauteren, S. Ourselin, and J. Car-doso, "Generalised Dice Overlap as a Deep Learning Loss Function for Highly Unbalanced Segmentations," in Deep Learning in Medical Image Analysis and Multimodal Learning for Clinical Decision Support, pp. 240-248. Springer, 2017.

Of course, the invention is not limited to the at least one embodiment described and represented in the accompanying drawings. Modifications remain possible, particularly from the viewpoint of the composition of the various elements or by substitution of technical equivalents without thereby exceeding the field of protection of the invention.

The invention claimed is:

1. A computer implemented method for segmenting and identifying at least one tubular structure, having a 3D tree layout and located in at least one body part of a subject, in medical images showing a volume region of interest of said subject containing said body part(s), and for providing a labelled 3D image of said structure(s), said method mainly comprising the steps of:
providing a set of 2D medical images corresponding to respective mutually distinct sectional views across said region of interest containing said body part(s), the planes of said medical images being all perpendicular to a given direction or all mutually intersecting at a given straight line,
segmenting the visible section(s) of the concerned body part(s) present in each one of said 2D medical images, which comprises in particular the complete linear outline or external boundary of said body part(s) visible in the considered 2D image, and creating a corresponding 2D body part masking image,
pre-processing each 2D medical image, by applying the corresponding body part masking image to it and so producing processed images containing only the image data of the original 2D image which are related to said body part(s),
segmenting the tubular structure(s) in said resulting pre-processed images,
performing the previous steps with at least one other set of 2D medical images corresponding to other respective distinct sectional views, along other mutually parallel or intersecting planes, of said same volume region of interest containing said same body part(s), and
merging the results of the tubular structure segmentations of the different sets of pre-processed images, in order to provide a labelled 3D image of said tubular structure(s) of one or different kind(s)
wherein, before the steps of segmenting the concerned body part(s) in each one of the 2D medical images of a given set and creating a corresponding body part masking image, said images are undergoing operations of an initial treatment workflow comprising at least retrimming and resizing operations.

2. The method according to claim 1, wherein the step of segmenting the tubular structure(s) of a considered pre-processed image comprises taking also into account the image data of at least one other pre-processed sectional view, of the same set of images, which is adjacent said considered pre-processed image.

3. The method according to claim 1, wherein the body part segmenting steps are performed by using a 2D neural network and the tubular structure segmenting steps are performed by using a 2,5D neural network.

4. The method according to claim 1, wherein a dedicated neural network, previously trained on data labelled by expert(s), is used for the body part segmenting and pre-processing steps of each set of 2D medical images, a dedicated and specifically trained neural network being also used for segmenting the tubular structure(s) in each set of pre-processed images.

5. The method according to claim 4, wherein, in a preliminary preparatory phase, the final training parameters values of the neural network intended to handle a first set of medical images are used as starting parameter values for the training of at least one other neural network intended to handle another set of medical images, in the pre-processing phase or in the tubular structure segmenting phase.

6. The method according to claim 1, wherein a first set of medical images correspond to axial views of the subject and wherein second and third sets of medical images correspond respectively to sagittal and coronal views.

7. The method according to claim 1, wherein the steps of segmenting the concerned body part(s) in each one of said 2D medical images and creating a corresponding body part masking image consist in determining the outline(s) or internal area(s) of said body parts(s) and in locating and identifying the connection site(s) of the internal tubular structure(s) with at least one other body part or body component, said latter being or not part of the masking image.

8. The method according to claim 1, wherein, during the pre-processing phase, the modified pre-processed image resulting from applying the body part masking image to an original 2D medical image, is submitted, before applying the step of segmenting the tubular structure(s), to isotropic resampling and rescaling operations.

9. The method according to claim 1, wherein any medical image for which the corresponding body part masking image, in anyone of the sets of medical images, is empty and any pre-processed image which does not show any part of the considered body part(s) are disregarded in view of further processing.

10. The method according to claim 1, wherein the medical images are images of the thoracic cavity of a human subject, wherein the concerned body parts are the lungs, wherein the segmenting step also includes identifying the left lung and the right lung and wherein at least certain body part masking images also contain the representation of the trachea and the connection area between pulmonary arteries and veins and the heart.

11. The method according to claim 10, wherein two different types of tubular structures are segmented in parallel, namely the bronchus tree and the pulmonary vascular tree, the arteries and veins being labelled within the vascular tree in a further step.

12. The method according to claim 10, wherein three different types of tubular structures are segmented in parallel, namely the bronchus tree, the pulmonary artery tree and the pulmonary vein tree.

13. The method according to claim 1, wherein the medical images are abdominal images, wherein the concerned body part is the liver and wherein the vascular system to be segmented and labelled comprises the portal vein, the hepatic vein and the hepatic artery.

14. The method according to claim 1, wherein the final merging step is performed by means of a fusion operation consisting of a type of operation chosen among fusion by union, fusion by majority voting, fusion by logits averaging, fusion by neural network and fusion by simultaneous truth and performance level estimation.

15. An image treatment system able to fully automatically perform organ and inside tubular structure segmentation and labeling, including lungs, bronchus, and pulmonary arteries and veins segmentation, said system relying on cascaded convolutional neural networks, said image treatment system configured to:
perform organ segmentation, based on a modified 2D U-Net architecture and based on a three-paths 2.5D fully convolutional networks along axial, coronal and sagittal slices, fed with pre-processed 2D images of the first component and configured to perform tubular structures and elements extraction and labelling,
wherein said image treatment is configured to perform the following steps
providing a set of 2D medical images corresponding to respective mutually distinct sectional views across said region of interest containing said body part(s), the planes of said medical images being all perpendicular to a given direction or all mutually intersecting at a given straight line,
segmenting the visible section(s) of the concerned body part(s) present in each one of said 2D medical images, which comprises in particular the complete linear outline or external boundary of said body part(s) visible in the considered 2D image, and creating a corresponding 2D body part masking image, pre-processing each 2D medical image, by applying the corresponding body part masking image to it and so producing processed images containing only the image data of the original 2D image which are related to said body part(s), segmenting the tubular structure(s) in said resulting pre-processed images, performing the previous steps with at least one other set of 2D medical images corresponding to other respective distinct sectional views, along other mutually parallel or intersecting planes, of said same volume region of interest containing said same body part(s), and merging the results of the tubular structure segmentations of the different sets of pre-processed images, in order to provide a labelled 3D image of said tubular structure(s) of one or different kind(s), wherein, before the steps of segmenting the concerned body part(s) in each one of the 2D medical images of a given set and creating a corresponding body part masking image, said images are undergoing operations of an initial treatment workflow comprising at least retrimming and resizing operations.

16. A computer implemented method for segmenting and identifying at least one tubular structure, having a 3D tree layout and located in at least one body part of a subject, in medical images showing a volume region of interest of said subject containing said body part(s), and for providing a labelled 3D image of said structure(s), said method mainly comprising the steps of:
providing a set of 2D medical images corresponding to respective mutually distinct sectional views across said region of interest containing said body part(s), the planes of said medical images being all perpendicular to a given direction or all mutually intersecting at a given straight line, segmenting the visible section(s) of the concerned body part(s) present in each one of said 2D medical images, which comprises in particular the complete linear outline or external boundary of said body part(s) visible in the considered 2D image, and creating a corresponding 2D body part masking image, pre-processing each 2D medical image, by applying the corresponding body part masking image to it and so producing processed images containing only the image data of the original 2D image which are related to said body part(s), segmenting the tubular structure(s) in said resulting pre-processed images, performing the previous steps with at least one other set of 2D medical images corresponding to other respective distinct sectional views, along other mutually parallel or intersecting planes, of said same volume region of interest containing said same body part(s), and merging the results of the tubular structure segmentations of the different sets of pre-processed images, in order to provide a labelled 3D image of said tubular structure(s) of one or different kind(s), wherein, during the pre-processing phase, the modified pre-processed image resulting from applying the body part masking image to an original 2D medical image, is submitted, before applying the step of segmenting the tubular structure(s), to isotropic resampling and rescaling operations.

17. A computer implemented method for segmenting and identifying at least one tubular structure, having a 3D tree layout and located in at least one body part of a subject, in medical images showing a volume region of interest of said subject containing said body part(s), and for providing a labelled 3D image of said structure(s), said method mainly comprising the steps of:
providing a set of 2D medical images corresponding to respective mutually distinct sectional views across said region of interest containing said body part(s), the planes of said medical images being all perpendicular to a given direction or all mutually intersecting at a given straight line, segmenting the visible section(s) of the concerned body part(s) present in each one of said 2D medical images, which comprises in particular the complete linear outline or external boundary of said body part(s) visible in the considered 2D image, and creating a corresponding 2D body part masking image, pre-processing each 2D medical image, by applying the corresponding body part masking image to it and so producing processed images containing only the image data of the original 2D image which are related to said body part(s), segmenting the tubular structure(s) in said resulting pre-processed images, performing the previous steps with at least one other set of 2D medical images corresponding to other respective distinct sectional views, along other mutually parallel or intersecting planes, of said same volume region of interest containing said same body part(s), and merging the results of the tubular structure segmentations of the different sets of pre-processed images, in order to provide a labelled 3D image of said tubular structure(s) of one or different kind(s), wherein any medical image for which the corresponding body part masking image, in anyone of the sets of medical images, is empty and any pre-processed image which does not show any part of the considered body part(s) are disregarded in view of further processing.

* * * * *